United States Patent
Resconi et al.

(10) Patent No.: US 11,560,440 B2
(45) Date of Patent: Jan. 24, 2023

(54) ALUMINOXANE-ACTIVATED METALLOCENE CATALYSTS

(71) Applicant: BOREALIS AG, Vienna (AT)

(72) Inventors: Luigi Maria Cristoforo Resconi, Linz (AT); Noureddine Ajellal, Porvoo (FI); Anna Fait, Linz (AT); Irfan Saeed, Porvoo (FI); Maria Ranieri, Porvoo (FI); David Quin, Teignmouth (GB); Vyatcheslav V. Izmer, Moscow (RU); Dmitry S. Kononovich, Moscow (RU); Oleg Samsonov, Moscow (RU); Alexander Z. Voskoboynikov, Moscow (RU)

(73) Assignee: Borealis AG, Vienna (AT)

( * ) Notice: Subject to any disclaimer, the term of this patent is extended or adjusted under 35 U.S.C. 154(b) by 81 days.

(21) Appl. No.: 16/499,514

(22) PCT Filed: Mar. 28, 2018

(86) PCT No.: PCT/EP2018/057921
§ 371 (c)(1),
(2) Date: Sep. 30, 2019

(87) PCT Pub. No.: WO2018/178151
PCT Pub. Date: Oct. 4, 2018

(65) Prior Publication Data
US 2021/0095057 A1   Apr. 1, 2021

(30) Foreign Application Priority Data

Mar. 30, 2017  (EP) .................... 17163946

(51) Int. Cl.
*C08F 210/16* (2006.01)
*C08F 4/6592* (2006.01)
*C08F 4/642* (2006.01)

(52) U.S. Cl.
CPC ........ *C08F 4/65927* (2013.01); *C08F 4/6428* (2013.01); *C08F 210/16* (2013.01)

(58) Field of Classification Search
CPC ............. C08F 4/65927; C08F 4/65904; C08F 210/16
See application file for complete search history.

(56) References Cited

U.S. PATENT DOCUMENTS

| | | | |
|---|---|---|---|
| 5,498,581 A | 3/1996 | Welch et al. | |
| 5,770,664 A | 6/1998 | Okumura et al. | |
| 7,312,283 B2 * | 12/2007 | Martin | C08F 10/00 526/170 |

(Continued)

FOREIGN PATENT DOCUMENTS

| | | |
|---|---|---|
| CN | 103380151 | 10/2013 |
| CN | 103025747 | 10/2015 |

(Continued)

OTHER PUBLICATIONS

International Search Report and Written Opinion in PCT/EP2018/057921. 11 pages.
A. Yano, M. Sone, S. Hasegawa, M. Sato, A. Akimoto, Macromol. Chem. Phys. 1999, 200, 933.
A. Yano, S. Hasegawa, T. Kaneko, M. Sone, M. Sato, A. Akimoto, Macromol. Chem. Phys. 1999, 200, 1542.
S. Hasegawa, M. Sone, M. Tanabiki, M. Sato, A. Yano, Journal of Polymer Science: Part A: Polymer Chemistry 2000, 38, 4641.
Q. Yang, M.D. Jensen, M. P. McDaniel, Macromolecules, 2010, 43, 8836.
Laine et al., Organometallics, 2011, 30, 1350-1359.
Yano et al., J. Molecular Catalysis A: Chemical, 2000, 156, 133-141.

(Continued)

*Primary Examiner* — Caixia Lu
(74) *Attorney, Agent, or Firm* — Meunier Carlin & Curfman LLC

(57) ABSTRACT

Catalyst system, the catalyst system comprising (i) at least one metallocene complex of formula (I) wherein Mt1 is Hf, X is a sigma-donor ligand, $R^1$, $R^2$, $R^3$ are the same or different from each other and can be hydrogen or a saturated linear or branched $C_1$-$C_{10}$ alkyl, whereby the alkyl group can optionally contain up to 2 heteroatoms belonging to groups 14-16 of the periodic table, or $R^1$ and $R^2$ or $R^2$ and $R^3$ can form a ring having 4 to 6 C-atoms and 1 to 3 double bonds, $R^4$ and $R^5$ are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms belonging to groups 14-16 of the periodic table, n can be 1 to 5, Ar is a $C_6$-$C_{20}$-aryl or -heteroaryl group, which can be unsubstituted or substituted by 1 to 5 linear or branched $C_1$-$C_{10}$ alkyl group(s), and (ii) an aluminoxane cocatalyst and (iii) optionally an aluminium alkyl compound Al$(R^7)_3$, with $R^7$ being a linear or branched $C_2$-$C_8$-alkyl group.

(I)

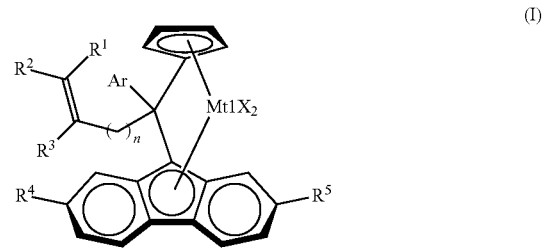

10 Claims, No Drawings

(56) References Cited

U.S. PATENT DOCUMENTS

| | | | |
|---|---|---|---|
| 2003/0092925 A1 | 5/2003 | Welch et al. | |
| 2005/0288461 A1* | 12/2005 | Jensen | C08F 10/00 |
| | | | 502/118 |
| 2006/0161013 A1 | 7/2006 | Tohi et al. | |
| 2007/0043176 A1 | 2/2007 | Martin et al. | |
| 2007/0060722 A1 | 3/2007 | Jayaratne et al. | |
| 2014/0128563 A1 | 5/2014 | McDaniel et al. | |

FOREIGN PATENT DOCUMENTS

| | | |
|---|---|---|
| CN | 106459278 | 11/2020 |
| EP | 1768990 | 1/2008 |
| EP | 2722346 | 4/2012 |
| EP | 2933275 | 10/2015 |
| EP | 2933276 | 12/2020 |
| JP | H08165310 A | 6/1996 |
| JP | 2009504901 A | 2/2009 |
| JP | 2009508980 A | 3/2009 |
| WO | 2000024792 | 10/1999 |
| WO | 2012/001051 | 1/2012 |
| WO | 2012/084961 | 6/2012 |
| WO | 2015/158790 | 10/2015 |

OTHER PUBLICATIONS

Office Action in connection to CN Application No. 2018800227577, dated Aug. 27, 2021.

Xiao Shijing et al, "Olefin coordination polymerization catalyst and polyolefin", Beijing: Beijing University of Technology Press, 2002, December, the first version, pp. 130-132, Dec. 31, 2002.

* cited by examiner

ALUMINOXANE-ACTIVATED METALLOCENE CATALYSTS

CROSS REFERENCE TO RELATED APPLICATIONS

This application is a national stage application filed under 35 U.S.C. § 371 of PCT/EP2018/057921, filed Mar. 28, 2018, which claims the benefit of priority to European Patent Application No. 17163946.1, filed Mar. 30, 2017, the contents of each are incorporated herein by reference in their entireties.

The present invention is related to a new catalyst system, which is especially able to produce polyethylene copolymers in a high temperature solution polymerization process. The new catalyst system comprises a specifically substituted, bridged hafnocene catalyst complex, comprising a cyclopentadienyl (Cp) ligand, a fluorenyl (Flu) ligand and a covalent bridge connecting the two ligands, along with an aluminoxane cocatalyst, optionally in the presence of an aluminium alkyl compound. This combination remarkably gives rise to catalyst systems with an improved balance of comonomer incorporation ability and molecular weight capability.

Metallocene catalysts have been used to manufacture polyolefins for many years. Countless academic and patent publications describe the use of these catalysts in olefin polymerization. Metallocenes are now used industrially and polypropylenes as well as polyethylenes are often produced using cyclopentadienyl based catalyst systems with different substitution patterns.

Several of these metallocene catalysts have been described for the use in solution polymerization for producing polyethylene homo- or copolymers.

For example WO 2000024792 describes a catalyst system comprising hafnocene catalyst complex derived from A) a biscyclopentadienyl hafnium organometallic compound having i) at least one unsubstituted cyclopentadienyl ligand or aromatic fused-ring substituted cyclopentadienyl ligand not having additional substituents on said ligand, ii) one substituted or unsubstituted, aromatic fused-ring substituted cyclopentadienyl ligand, and iii) a covalent bridge connecting the two cyclopentadienyl ligands.

This bridge can be a single carbon substituted with two aryl groups, each of these aryl groups being substituted with a $C_1$-$C_{20}$ hydrocarbyl or hydrocarbylsilyl group, whereby at least one of these substituents is a linear $C_3$ or greater substituent.

In addition the catalyst system comprises an activating cocatalyst, which is preferably a precursor ionic compound comprising a halogenated tetraaryl-substituted Group 13 anion.

Also US 20060161013 is related to bridged Cp-Flu metallocene complexes. The C-based bridges shown in the Examples are substituted methylene bridges, whereby the substituents are the same (e.g. dimethyl, diphenyl, dibenzyl, dicyclohexyl etc.) or are linked together to form a ring (e.g. cyclohexylidene).

EP 1768990 describes the synthesis of Cp-Flu metallocene complexes of Zr or Hf, in which the Flu-ligand is substituted in position 2 and 7. Both substituents on the bridge are aliphatic groups, whereby one can be an alkenyl.

US 2003092925 describes bridged Cp-Flu metallocene complexes wherein the C-based bridge is substituted by a terminally unsaturated hydrocarbyl substituent and by an aryl group and the Flu ligand is preferably unsubstituted. The complexes were used together with an aluminoxane cocatalyst or aluminium alkyl compound as cocatalyst in relative low temperature bulk or slurry polymerization.

Several researchers (literatures 1 to 5) studied the effect of ligand structure on ethylene copolymerization with various Cp-Flu metallocenes.

1. A. Yano, M. Sone, S. Hasegawa, M. Sato, A. Akimoto, *Macromol. Chem. Phys.* 1999, 200, 933.
2. A. Yano, S. Hasegawa, T. Kaneko, M. Sone, M. Sato, A. Akimoto, *Macromol. Chem. Phys.* 1999, 200, 1542.
3. A. Yano, M. Sone, S. Yamada, S. Hasegawa, M. Sato, A. Akimoto, *Journal of Molecular Catalysis A: Chemical* 2000, 156, 133.
4. S. Hasegawa, M. Sone, M. Tanabiki, M. Sato, A. Yano, *Journal of Polymer Science: Part A: Polymer Chemistry* 2000, 38, 4641.
5. Q. Yang, M. D. Jensen, and M. P. McDaniel *Macromolecules* 2010, 43, 8836

In none of the above cited scientific articles and patents the simultaneous increase of molecular weight capability and comonomer incorporation ability of the catalyst system is mentioned.

Furthermore the above cited literatures and patents do not address the possible influence of a higher polymerization temperature on the catalyst performance of a Hafnium complex with an alkenyl group on the bridge.

However, for a process for producing ethylene copolymers to be efficient, it is important that the catalyst system used has to fulfil a set of very strict requirements. Comonomer incorporation ability for higher comonomers (comonomer reactivity), catalyst molecular weight capability (lowest achievable melt index for a given polymer density, monomer concentration and polymerization temperature) and catalyst thermal stability must ensure the production of copolymers with density down to ~0.850 g/cm$^3$ and a melt index $MI_2$ (190° C., 2.16 kg) down to ~0.3 g/10 min with high productivity (in order to get a maximum of polyethylene produced with as low amount of catalyst as possible). This requires a reactivity ratio $C_{AO}/C_2$ of at least 0.1 (AO=alpha-olefin).

Although a lot of work has been done in the field of metallocene catalysts, there still remains a need to find new catalyst systems for ethylene copolymerization, which are able to produce polymers with desired properties and which have improved balance of comonomer incorporation ability and molecular weight capability.

As a consequence, the inventors set out to develop a new catalyst system having superior polymerization behaviour than the above mentioned polymerization catalyst systems regarding to comonomer incorporation ability and molecular weight capability.

The present inventors have now found a new class of olefin polymerization catalyst system, which is able to solve the problems disclosed above. In particular, the invention combines the use of special metallocene complexes with an aluminoxane cocatalyst.

SUMMARY OF INVENTION

Thus, viewed from one aspect the invention relates to a catalyst system, whereby the catalyst system comprises (i) at least one metallocene complex of formula (I)

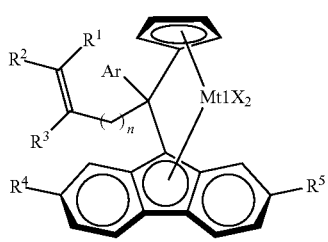

wherein

Mt1 is Hf,

X is a sigma-donor ligand, $R^1$, $R^2$, $R^3$ are the same or different from each other and can be hydrogen or a saturated linear or branched $C_1$-$C_{10}$ alkyl, whereby the alkyl group can optionally contain up to 2 heteroatoms belonging to groups 14-16 of the periodic table, or $R^1$ and $R^2$ or $R^2$ and $R^3$ can form a ring having 4 to 6 C-atoms and 1 to 3 double bonds, $R^4$ and $R^5$ are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms belonging to groups 14-16 of the periodic table, n can be 1 to 5, Ar is a $C_6$-$C_{20}$-aryl or -heteroaryl group, which can be unsubstituted or substituted by 1 to 5 linear or branched $C_1$-$C_{10}$ alkyl group(s), and (ii) an aluminoxane cocatalyst and (iii) optionally an aluminium alkyl compound $Al(R^7)_3$, with $R^7$ being a linear or branched $C_2$-$C_8$-alkyl group.

Viewed from another aspect the invention provides the use of such catalyst systems for producing ethylene copolymers in a high temperature solution process.

Viewed from a further aspect the invention provides a process for the preparation of an ethylene copolymer comprising polymerizing ethylene and a $C_{4-10}$ alpha-olefin comonomer in a high temperature solution process at a temperature greater than 100° C. in the presence of a catalyst comprising:

(i) at least a metallocene complex of formula (I) as defined above and (ii) an aluminoxane cocatalyst and (iii) optionally an aluminium alkyl compound $Al(R^7)_3$, with $R^7$ being a linear or branched $C_2$-$C_8$-alkyl group.

In yet another aspect the present invention provides an activation method including contacting at least a complexes of formula (I) with the reaction product of an aluminoxane cocatalyst with an aluminium alkyl compound $Al(R^7)_3$ before polymerization.

Viewed from still a further aspect the invention provides an ethylene copolymer made by a process as hereinbefore defined.

DETAILED DESCRIPTION OF THE INVENTION

Metallocene Complex

The single site metallocene complex, especially the complexes defined by the formula (I) specified in the present invention, are asymmetrical, meaning that the two ligands forming the metallocene complex are different.

The invention can be effected with at least one metallocene complex of formula (I)

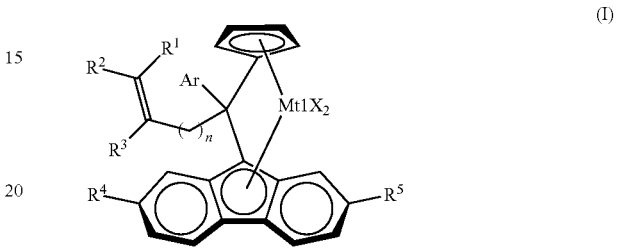

wherein

Mt1 is Hf,

X is a sigma-donor ligand, $R^1$, $R^2$, $R^3$ are the same or different from each other and can be hydrogen or a saturated linear or branched $C_1$-$C_{10}$ alkyl, whereby the alkyl group can optionally contain up to 2 heteroatoms belonging to groups 14-16 of the periodic table, or $R^1$ and $R^2$ or $R^2$ and $R^3$ can form a ring having 4 to 6 C-atoms and 1 to 3 double bonds, $R^4$ and $R^5$ are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms belonging to groups 14-16 of the periodic table, n can be 1 to 5, Ar is a $C_6$-$C_{20}$-aryl or -heteroaryl group, which can be unsubstituted or substituted by 1 to 5 linear or branched $C_1$-$C_{10}$ alkyl group(s).

The invention can also be effected with a mixture of the metallocene complex of formula (I) as defined above with a metallocene complex of formula (I')

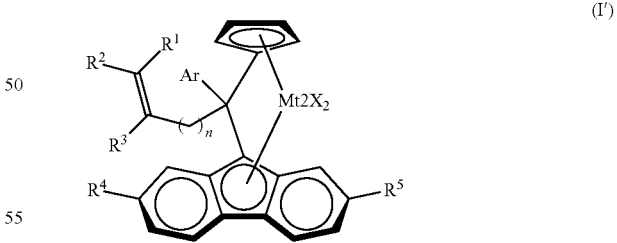

wherein Mt2 is Zr, $R^1$ to $R^5$ and Ar are defined as for complex of formula (I), provided that the mixture contains more than 50% by moles of the complex of Formula I with Mt1 being Hf.

In the formulas (I and I') each X, which may be the same or different, is a sigma-donor ligand, preferably a hydrogen atom, a halogen atom, a $R^6$, $OR^6$, $OSO_2CF_3$, $OCOR^6$, $SR^6$, $NR^6_2$ or $PR^6_2$ group, wherein $R^6$ is a linear or branched, cyclic or acyclic $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radical, optionally containing up to 2 heteroatoms belonging to groups 14-16, or is $SiR^6_3$, $SiHR^6_2$ or $SiH_2R^6$. $R^6$ is preferably $C_{1-6}$-alkyl, phenyl or benzyl group.

The term halogen includes fluoro, chloro, bromo and iodo groups, preferably chloro groups.

The term heteroatoms belonging to groups 14-16 of the periodic table includes for example Si, N, O or S.

More preferably each X is independently a halogen atom or a $R^6$ or $OR^6$ group, whereby $R^6$ is a $C_{1-6}$-alkyl, phenyl or benzyl group.

More preferably X is methyl, chloro or benzyl group. Even more preferably both X groups are the same. Most preferably X is a methyl or chloro group.

$R^1$, $R^2$, $R^3$ are the same or different from each other and can be hydrogen or a saturated linear or branched $C_1$-$C_{10}$ alkyl, whereby the alkyl group can optionally contain up to 2 heteroatoms belonging to groups 14-16 of the periodic table, or $R^1$ and $R^2$ or $R^2$ and $R^3$ can form a ring having 4 to 6 C-atoms and 1 to 3 double bonds.

Such rings include for example cyclopentenyl or phenyl.

The term heteroatoms belonging to groups 14-16 of the periodic table includes for example Si, N, O or S.

Preferably $R^1$, $R^2$, $R^3$ are the same or different from each other and can be hydrogen, a saturated linear or branched $C_1$-$C_6$ alkyl group, whereby the alkyl group does not contain any heteroatoms belonging to groups 14-16 of the periodic table, or $R^1$ is hydrogen and $R^2$ and $R^3$ form a ring having 5 to 6 C-atoms and 1 to 3 double bonds.

More preferably $R^1$, $R^2$, $R^3$ are the same or different from each other and can be hydrogen, a saturated linear or branched $C_1$-$C_4$ alkyl, whereby the alkyl group does not contain any heteroatoms belonging to groups 14-16 of the periodic table or $R^1$ is hydrogen and $R^2$ and $R^3$ form a ring having 6 C-atoms and 3 double bonds. In this case the ring is a phenyl ring.

Most preferably $R^1$, $R^2$, $R^3$ are the same and are all hydrogen or $R^1$ is hydrogen and $R^2$ and $R^3$ form a ring having 6 C-atoms and 3 double bonds, i.e. a phenyl ring.

$R^4$ and $R^5$ are the same or different from each other and can be saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which can optionally contain up to 2 heteroatoms belonging to groups 14-16 of the periodic table, like Si, N, O or S. $C_6$-$C_{20}$ alkylaryl group is meant to be a $C_6$-$C_{10}$ aryl group which is substituted by one or more alkyl groups which may be the same or different, whereby the number of C-atoms in the alkyl group substituents is in a range which leads to $C_6$-$C_{20}$ alkylaryl groups.

Preferably $R^4$ and $R^5$ are the same or different from each other and can be a saturated linear or branched $C_1$-$C_{10}$ alkyl or $C_6$-$C_{10}$ aryl group, whereby the groups do not contain any heteroatoms belonging to groups 14-16 of the periodic table.

More preferably $R^4$ and $R^5$ are the same or different from each other and can be a saturated linear or branched $C_1$-$C_6$ alkyl or phenyl, whereby the groups do not contain any heteroatoms belonging to groups 14-16 of the periodic table.

Most preferably $R^4$ and $R^5$ are the same and are a saturated linear or branched $C_2$-$C_6$ alkyl.

n can be 1 to 5, preferably n is 2 to 4.

Ar is a $C_6$-$C_{20}$-aryl or -heteroaryl group, which can be unsubstituted or substituted by 1 to 5 linear or branched $C_1$-$C_{10}$ alkyl group(s).

Preferably Ar is a $C_6$-$C_{10}$-aryl or -heteroaryl group, which can be unsubstituted or substituted by one linear or branched $C_1$-$C_6$ alkyl group.

More preferably Ar is an unsubstituted $C_6$-$C_{10}$-aryl group, most preferably Ar is phenyl.

If a mixture of complexes of formula (I) and formula (I') is used it is preferred that the substituents $R^1$ to $R^6$ and Ar are the same for both complexes.

Specific examples of complexes of formula (I) are
(phenyl)(but-3-en-1-yl)methylene(cyclopentadienyl)(2,7-di-tert-butylfluoren-9-yl)hafnium dichloride,
(phenyl)(but-3-en-1-yl)methylene(cyclopentadienyl)(2,7-di-tert-butylfluoren-9-yl)hafnium dimethyl,
(phenyl)(but-3-en-1-yl)methylene(cyclopentadienyl)(2,7-di-tert-butylfluoren-9-yl)hafnium dibenzyl,
(phenyl)(4-penten-1-yl)methylene(cyclopentadienyl)(2,7-di-tert-butylfluorenyl)hafnium dichloride,
(phenyl)(4-penten-1-yl)methylene(cyclopentadienyl)(2,7-di-tert-butylfluorenyl)hafnium dimethyl,
(phenyl)(4-penten-1-yl)methylene(cyclopentadienyl)(2,7-di-tert-butylfluorenyl)hafnium dibenzyl,
(phenyl)(5-hexen-1-yl)methylene(cyclopentadienyl)(2,7-di-tert-butylfluoren-9-yl)hafnium dichloride,
(phenyl)(5-hexen-1-yl)methylene(cyclopentadienyl)(2,7-di-tert-butylfluoren-9-yl)hafnium dimethyl,
(phenyl)(5-hexen-1-yl)methylene(cyclopentadienyl)(2,7-di-tert-butylfluoren-9-yl)hafnium dibenzyl,
and the corresponding zirconium analogues of formula (I').

Even more preferred are the dimethyl-complexes of formula (I) and (I').

Most preferable only complexes of formula (I) are used.

Cocatalyst

To form an active catalytic species it is normally necessary to employ a cocatalyst as is well known in the art.

The present invention requires the use of an aluminoxane cocatalyst

The aluminoxane cocatalyst can be one of formula (II):

(II)

where n is usually from 6 to 20 and R has the meaning below.

Aluminoxanes are formed on partial hydrolysis of organoaluminum compounds, for example those of the formula $AlR_3$ or $AlR_2H$, where R can be, for example, $C_1$-$C_{10}$ alkyl, preferably $C_1$-$C_5$ alkyl, or $C_{3-10}$-cycloalkyl, $C_7$-$C_{12}$-arylalkyl or alkylaryl and/or phenyl or naphthyl. The resulting oxygen-containing aluminoxanes are not in general pure compounds but mixtures of oligomers of the formula (II).

The preferred aluminoxane in the process according to the invention is methylaluminoxane (MAO).

The aluminoxane may as well contain minor amounts of a borane or borate compound, which is suitable as cocatalyst. Such borane or borate compounds are well known in the art.

Minor amounts are up to 10 wt % based on the total weight of the mixture of aluminoxane and borane or borate compounds.

Since the aluminoxanes used according to the invention as cocatalysts are not, owing to their mode of preparation, pure compounds, the molarity of aluminoxane solutions hereinafter is based on their aluminium content.

The molar ratio of Al in the aluminoxane to the transition metal of the metallocene may be in the range of 1:1 to 2000:1 mol/mol, preferably 10:1 to 1000:1, more preferably 50:1 to 500:1 mol/mol.

Suitable amounts of cocatalyst will be well known to the skilled man.

In an embodiment of the present invention aluminoxane (ii), preferably methylaluminoxane, and an aluminium alkyl compound of the formula Al($R^7$)$_3$ with $R^7$ being a linear or branched $C_2$-$C_8$-alkyl group (iii) are used as cocatalyst.

In this case the cocatalyst is preferably a reaction product of (ii) the aluminoxane, preferably methylaluminoxane with (iii) the aluminium alkyl compound, such as tri-iso-butyl aluminum, tri-iso-hexyl aluminium, tri-n-octyl aluminum, tri-iso-octyl aluminium and the like. The ratio between methylalumoxane and the aluminium alkyl compound can be between 10:1 and 1:10, preferably 5:1 to 1:5, most preferably 3:1 to 1:3 moles of Al in the methylalumoxane to moles of aluminium of the aluminium alkyl compound. The reaction between methylaluminoxane and the aluminium alkyl compound is carried out by mixing the two components in a suitable solvent, which can be aromatic or aliphatic, at a temperature between −50° to +80° C., preferably between 10° and 50° C., more preferably between 20° and 40° C.

The metallocene complex of the present invention can be used in combination with the cocatalyst(s) as a catalyst system for the polymerization of ethylene and $C_{4-10}$ alpha-olefin comonomer in a high temperature solution polymerization process.

The catalyst system of the invention may be used as a homogeneous catalyst or heterogeneous catalyst, preferably as homogeneous catalyst system.

Homogeneous or non-supported catalyst systems, suitable for the present invention can be prepared in solution, for example in an hydrocarbon solvent like hexane, cyclohexane, heptane, light naphtha or toluene, by contacting the metallocene of formula (I) or a mixture of metallocene of formula (I) and (I') (as a solid or as a solution) with the cocatalyst(s) as slurry in a hydrocarbon diluent or previously dissolved in an aromatic solvent, or can be formed by sequentially adding the catalyst components directly into the polymerization reactor.

In an embodiment of the present invention the activation of the catalyst system comprises activation method including contacting (i) at least one metallocene complex of formula (I), optionally mixed with a metallocene complex of formula (I') wherein Mt2 is Zr, $R^1$ to $R^6$ and Ar are defined as for complex of formula (I), provided that the mixture contains more than 50% by moles of the complex of Formula I with Mt being Hf, with the reaction product of an aluminoxane cocatalyst (ii) with an aluminium alkyl compound Al($R^7$)$_3$ (iii), before being introduced into the polymerization reactor.

The contacting time is preferably one hour or more, more preferably more than 6 hours. Most preferably the contacting time is more than 10 hours.

Polymer

The polymer to be produced using the catalyst system of the invention is copolymer of ethylene and a $C_{4-10}$ alpha-olefin comonomer, like 1-butene, 1-hexene, 4-methyl-1-pentene, 1-octene etc. Preferably butene, hexene or octene and more preferably octene is used as comonomer. The comonomer content in such a polymer may be up to 45 wt %, preferably between 1 to 40 wt %, more preferably 1.5 to 35 wt % and even more preferably 2 to 25 wt %.

The density (measured according to ISO 1183-187) of the polymers is in the range of 0.850 g/cm$^3$ to below 0.920 g/cm$^3$, preferably in the range of 0.850 g/cm$^3$ to 0.915 g/cm$^3$ and more preferably in the range of 0.850 g/cm$^3$ to 0.910 g/cm$^3$.

Mw/Mn value of the polymers of the invention is less than 5, e.g. in the range of 2.0 to 4.5, preferably in the range of 2.5 to 4.5.

The melting points (measured with DSC according to ISO 11357-3:1999) of the polymers to be produced are below 130° C., preferably below 120° C., more preferably below 110° C. and most preferably below 100° C.

Polymerization

The catalyst system of the present invention is preferably used to produce the above defined ethylene copolymers in a high temperature solution polymerization process at temperatures higher than 100° C.

In view of this invention such process is essentially based on polymerizing the monomer and a suitable comonomer in a hydrocarbon solvent, being liquid under the polymerization conditions and in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

A solution polymerization process is known for its short reactor residence times (compared to Gas-phase or slurry processes) allowing, thus, very fast grade transitions and significant flexibility in producing a wide product range in a short production cycle.

According to the present invention the used solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in the reactor depends on the temperature, on one hand, and the type and the amount of the comonomer, on the other hand. The pressure is suitably from 50 to 300 bar, preferably from 60 to 250 bar and more preferably from 70 to 200 bar.

The hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

One embodiment of the present invention is thus a process for the preparation of an ethylene copolymer comprising polymerizing ethylene and a $C_{4-10}$ alpha-olefin comonomer in a high temperature solution process at a temperature greater than 100° C. in the presence of a catalyst system comprising:

(i) at least one metallocene complex of formula (I) as defined above or a mixture of a metallocene complex of formula (I) and a metallocene complex of formula (I') as defined above and (ii) an aluminoxane cocatalyst and (iii) optionally an aluminium alkyl compound Al($R^7$)$_3$, with $R^7$ being a linear or branched $C_2$-$C_8$-alkyl group, whereby the components (i), (ii) and optional (iii) can be introduced into the polymerization reactor separately or component (i) is first activated by contacting component (i) with the reaction product of the aluminoxane cocatalyst (ii) with an aluminium alkyl compound Al($R^7$)$_3$ (iii) and afterwards the activated component (i) is introduced into the polymerization reactor.

Advantage

The new catalyst systems, comprising component (i), (ii) and optionally (iii) can be advantageously used for ethylene copolymerization in high temperature solution polymerization process.

The catalyst systems according to the present invention show improved balance of comonomer incorporation ability and molecular weight capability, if used for ethylene copolymerization in high temperature solution polymerization process.

Applications

The polymers made by the catalyst system of the invention are useful in all kinds of end articles such as pipes, films (cast or blown films), fibers, moulded articles (e.g. injection moulded, blow moulded, rotomoulded articles), extrusion coatings and so on.

The invention will now be illustrated by reference to the following non-limiting examples Methods

DSC

Temperature modulated DSC experiments were performed in a TA Instruments Q2000 DSC operated in modulated mode and calibrated with indium, tin and zinc according to ISO 11357-1. Circa 5 mg of the sample were placed in an aluminium pan. The temperature was initially raised to 180° C. and afterwards lowered to −88° C. at 10° C./min as in standard DSC. Afterwards the temperature was raised by a temperature modulated scan with heating rate of 2° C./min modulated of 0.32° C. every 60 seconds. The glass transition temperature was measured from the reversible heat flow thermogram as the inversion point at transition.

If the polymer composition has been estimated by Tg(DSC) the following internal correlation has been used: C8 (wt %)=(Tg(° C.)+19.16)/−1.059

Zr and Hf Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Quantification of Comonomer Content by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe-head at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.[1],[2],[3],[4] Standard single-pulse excitation was employed utilising the transient NOE at short recycle delays of 3 s[5],[1] and the RS-HEPT decoupling scheme.[6],[7] A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm.[8]

Characteristic signals corresponding to the incorporation of 1-octene were observed[8],[9],[10],[11],[12] and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both *B6 and *ββB6B6 sites of isolated (EEOEE) and isolated double non-consecutive (EEOEOEE) 1-octene sequences respectively. To compensate for the influence of the two *ββB6B6 sites the integral of the ββB6B6 site at 24.7 ppm is used:

$$O = I_{*B6+*\beta\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the ααB6B6 sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO=3/2*I_{ααγB6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total}=O+OO+OEO+OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S=(1/2)*(I_{2S+2B6}+I_{3S+3B6}-2*O_{total})$$

The ethylene comonomer content was quantified using the integral of the bulk methylene (bulk) signals at 30.00 ppm. This integral included the γ and 4B6 sites from 1-octene as well as the δ⁺ sites. The total ethylene comonomer content was calculated based on the bulk integral and compensating for the observed 1-octene sequences and end-groups:

$$E_{total}=(1/2)*[I_{bulk}+2*O+1*OO+3*OEO+0*OOO+3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO=(O_{total}/(E_{total}+O_{total})$$

The total comonomer incorporation of 1-octene in weight percent was calculated from the mole fraction in the standard manner:

$$O\ [wt\ \%]=100*(fO*112.21)/((fO*112.21)+((1-fO)*28.05))$$

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Castignolles, P., Graf, R., Parkinson, M., Wilhelm, M., Gaborieau, M., Polymer 50 (2009) 2373
[4] NMR Spectroscopy of Polymers: Innovative Strategies for Complex Macromolecules, Chapter 24, 401 (2011)
[5] Pollard, M., Klimke, K., Graf, R., Spiess, H. W., Wilhelm, M., Sperber, O., Piel, C., Kaminsky, W., Macromolecules 2004; 37:813.
[6] Filip, X., Tripon, C., Filip, C., J. Mag. Resn. 2005, 176, 239
[7] Griffin, J. M., Tripon, C., Samoson, A., Filip, C., and Brown, S. P., Mag. Res. in Chem. 2007 45, S1, S198
[8] J. Randall, Macromol. Sci., Rev. Macromol. Chem. Phys. 1989, C29, 201.
[9] Liu, W., Rinaldi, P., McIntosh, L., Quirk, P., Macromolecules 2001, 34, 4757
[10] Qiu, X., Redwine, D., Gobbi, G., Nuamthanom, A., Rinaldi, P., Macromolecules 2007, 40, 6879
[11] Busico, V., Carbonniere, P., Cipullo, R., Pellecchia, R., Severn, J., Talarico, G., Macromol. Rapid Commun. 2007, 28, 1128
[12] Zhou, Z., Kuemmerle, R., Qiu, X., Redwine, D., Cong, R., Taha, A., Baugh, D. Winniford, B., J. Mag. Reson. 187 (2007) 225

HT-SEC: Molecular Weight Averages, Molecular Weight Distribution, and Polydispersity Index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) of the polymer were determined by high temperature size exclusion chromatography (HT-SEC) on a Polymer Laboratories PLXT-20 Rapid GPC Polymer Analysis System (including pump, refractive index detector and viscosity detector) at 160° C. with 3 PLgel Olexis (300×7.5 mm, Polymer Laboratories) columns in series. 1,2,4-Trichlorobenzene containing butylated hydroxytoluene (0.5 g/L) and Irganox 1010 (20 mg/L) was used as eluent at a flow rate of 1.0 mL/min. The molecular weights were calculated with respect to polyethylene standards (Polymer Laboratories, Mp=5.310 up to Mp=1.510.000 g/mol). A Polymer Laboratories PL XT-220 robotic sample handling system was used as autosampler. The concentration of the samples was between 2 and 4 mg polymer/mL of TCB.

Determination of the Relative Comonomer Reactivity Ratio R

Ethylene concentration in liquid phase can be considered constant since total pressure is kept constant by feeding ethylene during polymerization. The $C_{AO}/C_2$ ratio, e.g. the $C_8/C_2$ ratio in solution at the end of the polymerization is calculated by subtracting the amount of comonomer, e.g. octene incorporated in the polymer from the measured composition of the latter (% wt comonomer, e.g. 1-octene)

The reactivity ratio, R, for each catalyst is then calculated as:

$$R=[(C_8/C_2)_{pol}]/[(C_8/C_2)_{average\ in\ liquid\ phase}]$$

where $(C_8/C_2)$ average in liquid phase is calculated as $((C_8/C_2)_{final}+(C_8/C_2)_{feed})/2$ Chemicals MAO 30% wt in toluene purchased from Chemtura
Tri-isobutylalkyl (TIBA) purchased from Aldrich
1-octene as co-monomer (99%, Sigma Aldrich) was dried over molecular sieves and degassed with nitrogen before use.

Isopar-E (from ExxonMobil, iso alkanes C7-10, CAS No: 90622-56-3) purchased from Brenntag was purified passing it subsequently through two columns containing (i) BTS-catalyst (Cu), to remove oxygen, and (ii) molecular sieves 3 Å as drying agent and Selexsorb CD (BASF) to remove polar impurities.

Chemicals Used for Catalyst Complex Synthesis:

HfCl₄, <1 (mol) % Zr (Strem Chemicals), 9H-fluorene (Acros), 2.5 M "BuLi in hexanes (Chemetall), KH (Aldrich), 1-bromobutane (Acros), benzophenone (Acros), 1,2-dibromoethane (Acros), chlorotrimethylsilane (Acros), 2-bromo-2-methylpropionyl bromide (Acros), ethyl benzoylacetate (Aldrich), allyl bromide (Acros), 4-bromobut-1-ene (Aldrich), 1,4-diphenylbutan-1-one (ABCR), TsOH (Aldrich), triethylamine (Acros), methyl iodide (Merck), THF (Merck), hexane (Merck), ethyl acetate (Merck), diethyl ether (Merck), dichloromethane (Merck), toluene (Merck), methanol (Merck), dimethylsulfoxide (Merck), silica gel 60, 40-63 µm (Merck), 8 M HCl (Merck), Na$_2$SO$_4$ (Akzo Nobel), K$_2$CO$_3$ (Merck), AlCl$_3$ (Merck), NaBH$_4$ (Aldrich), Na$_2$CO$_3$ (Merck), CuCN (Merck), NaHCO$_3$ (Merck), bromine (Merck) and KOH (Merck) were used as received.

Toluene and hexane for organometallic synthesis as well as CDCl$_3$ (Deutero GmbH) for NMR measurements of air and moisture sensitive compounds were dried over molecular sieves 4A (Acros).

THF and ether for organometallic synthesis were distilled over benzophenone ketyl.

Cyclopentadienyllithium was prepared from cyclopentadiene obtained from dicyclopentadiene (Acros) and butyllithium in hexanes according to a literature procedure [Den Besten, R.; Harderm S.; Brandsma, L. *J. Organomet. Chem.* 1990, 385, 153].

Cyclopentadienylmagnesium bromide was prepared from cyclopentadiene obtained from dicyclopentadiene (Acros) and methylmagnesium bromide in ether (Aldrich) as described in [Stille, J. R.; Grubbs, R. H. *J. Org. Chem* 1989, 54, 434].

1-Phenylhept-6-en-1-one was prepared from 5-bromo-1-pentene (Aldrich), acetophenone (Merck), N,N-dimethylhydrazine (Aldrich) and lithium diisopropylamide (Aldrich) according to the literature procedure [Motiwala, H. F.; Gülgeze, B., Aubé, J. *J. Org. Chem.* 2012, 77, 7005].

2,7-Di-tert-butylfluorene was obtained from 9H-fluorene and 2,6-di-tert-butyl-p-cresole (Aldrich) as described in [Kajigaeshi, S.; Kadowaki, T.; Nishida, A.; Fujisaki, S.; Noguchi, M. *Synthesis* 1984, 335]

Catalyst Preparation Examples

Complex 1 (C-1)

(Phenyl)(5-hexen-1-yl)methylene(cyclopentadienyl)(2,7-di-tert-butylfluoren-9-yl) hafnium dichloride Step 1: 1-Phenyl-1-(hex-5-en-1-yl)-1-cyclopentadienyl-1-(2,7-di-tert-butylfluorenyl)methane

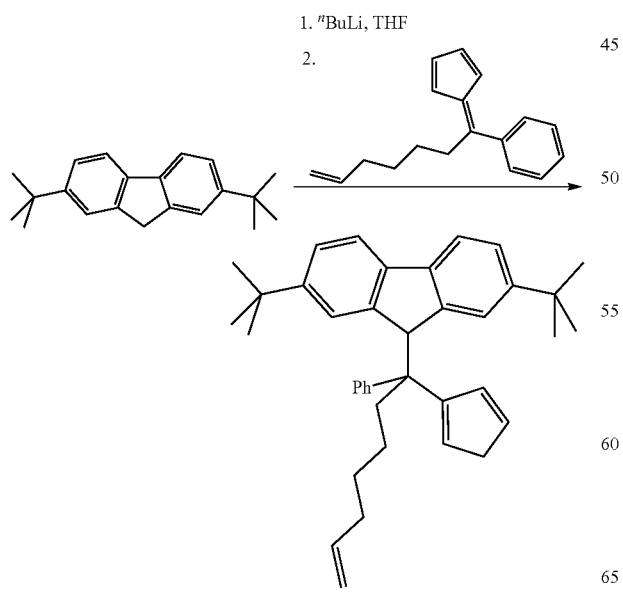

To a solution of 10.59 g (38.04 mmol) of 2,7-di-tert-butylfluorene in 125 ml of THF cooled to −78° C., 15.2 ml (36.5 mmol) of 2.5 M $^n$BuLi in hexanes was added in one portion. This mixture was stirred overnight at room temperature. The resulting light-orange solution was cooled to −30° C., and a solution of 9.46 g (40.03 mmol, 1.05 eq) of 6-phenyl-6-(hex-5-en-1-yl)fulvene in 125 ml of THF was added in one portion. After stirring overnight at room temperature the dark-red reaction mixture was cooled in an ice-bath and then quenched with 10% HCl to a slightly acidic pH. The resulting orange mixture was diluted with 400 ml of water and extracted with 300 ml of diethyl ether. The organic layer was separated, and the aqueous one was extracted with 150 ml of dichloromethane. The combined organic extract was dried over Na$_2$SO$_4$ and filtered through a pad of silica gel 60 (40-63 µm) which was additionally washed by 2×50 ml of dichloromethane. Removal of the solvents under vacuum gave an orange oil which was dissolved in 125 ml of n-hexane. Crystals precipitated from this solution overnight at −30° C. were collected and dried in vacuum. This procedure gave 14.61 g (75%) of a slightly yellow solid of the title product as a mixture of isomers.

Anal. calc. for C$_{39}$H$_{46}$: C, 90.99; H, 9.01. Found: C, 91.14; H, 9.07.

$^1$H NMR (CDCl$_3$): δ 7.57-6.95 (m, 11H), 6.34-5.59 (m, 4H), 4.98-4.70 (m, 3H), 2.93-2.55 (m, 2H), 2.49-2.15 (m, 2H), 2.04-1.80 (m, 2H), 1.46-0.91 (m, 22H).

Step 2: (Phenyl)(5-hexen-1-yl)methylene(cyclopentadienyl)(2,7-di-tert-butylfluoren-9-yl)hafnium dichloride

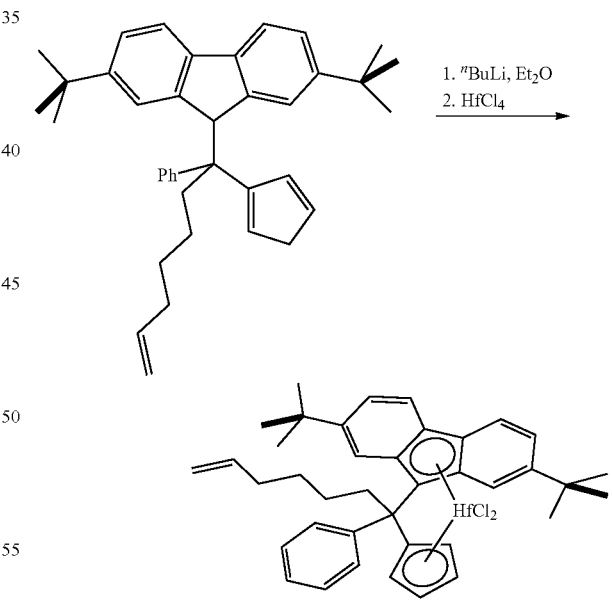

To a solution of 14.61 g (28.38 mmol) of 1-phenyl-1-(hex-5-en-1-yl)-1-cyclopentadienyl-1-(2,7-di-tert-butylfluorenyl)methane in 300 ml of ether, cooled to −50° C., 22.7 ml (56.8 mmol) of 2.5 M $^n$BuLi in hexanes was added in one portion. This mixture was stirred for 5 h at room temperature. The resulting reddish solution was cooled to −50° C., and 9.09 g (28.38 mmol) of HfCl$_4$ was added. The formed mixture was stirred for 24 h at room temperature and then evaporated to dryness. The residue was stirred with 200 ml of warm toluene, and the formed suspension was filtered through a glass frit (G4). The filtrate was evaporated to ca. 30 ml, and 70 ml of n-hexane was added. Yellow crystalline solid precipitated overnight at −30° C. was collected and dried in vacuum. This procedure gave 12.9 g (60%) of the target complex.

Anal. calc. for $C_{39}H_{44}Cl_2Hf$: C, 61.46; H, 5.82. Found: C, 61.59; H, 6.00.

$^1$H NMR (CDCl$_3$): δ 8.01 (d, J=9.1 Hz, 1H), 7.96 (d, J=8.9 Hz, 1H), 7.83 (dm, J=7.7 Hz, 1H), 7.69 (m, 1H), 7.66-7.59 (m, 2H), 7.59-7.52 (m, 1H), 7.5 (dd, J=8.9 Hz, J=1.4 Hz, 1H), 7.45-7.38 (m, 2H), 6.35-6.31 (m, 1H), 6.22-6.18 (m, 1H), 6.13 (s, 1H), 5.81-5.69 (m, 2H), 5.55-5.51 (m, 1H), 4.94 (dm, J=17.2 Hz, 1H), 4.89 (dm, J=10.2 Hz, 1H), 3.13-2.99 (m, 1H), 2.82-2.67 (m, 1H), 2.15-1.95 (m, 2H), 1.66-1.45 (m, 4H), 1.40 (s, 9H), 0.99 (s, 9H). $^{13}$C{$^1$H} NMR (CDCl$_3$): δ 152.19, 149.61, 143.26, 138.38, 130.52, 128.51, 128.33, 127.24, 127.08, 124.22, 124.18, 124.02, 123.52, 122.63, 120.25, 119.87, 119.67, 118.84, 117.81, 116.62, 114.65, 114.52, 99.66, 77.77, 53.68, 41.16, 35.44, 34.87, 33.80, 31.13, 30.53, 29.45, 23.64.

Complex 2 (C-2)

(Phenyl)(5-hexen-1-yl)methylene(cyclopentadienyl)(2,7-di-tert-butylfluoren-9-yl) hafnium dimethyl

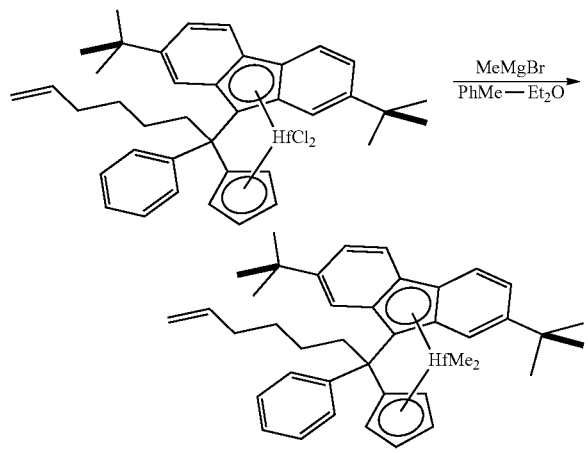

To a solution of 7.1 g (9.32 mmol) of Complex 1 (C-1), produced as described above, in a mixture of 90 ml of toluene and 50 ml of ether 13.0 ml (27.43 mmol) of 2.11 M MeMgBr in ether was added. The resulting mixture was refluxed for 30 min and then evaporated to ca. 40 ml. The obtained solution was heated to 80-90° C. and filtered while hot through glass frit (G4) to remove insoluble magnesium salts. The filter cake was additionally washed with 2×20 ml of toluene. The combined filtrate was evaporated to ca. 20 ml. This solution was heated again to 80-90° C. and filtered while hot through glass frit (G4). The mother liquor was evaporated to dryness, and the residue was dissolved in 30 ml of hexane. Yellow powder precipitated from this solution overnight at −30° C. was collected and dried in vacuum. This procedure gave 3.20 g of pure (phenyl)(5-hexen-1-yl)methylene(cyclopentadienyl)(2,7-di-tert-butylfluoren-9-yl) hafnium dimethyl. In the same way, but using smaller volumes of hexane (ca. 20 ml and 5 ml), another two portions (1.18 g and 0.57 g) of the desired complex were obtained. So, the total yield of (phenyl)(5-hexen-1-yl)methylene (cyclopentadienyl)(2,7-di-tert-butylfluoren-9-yl) hafnium dimethyl was 4.95 g (74%).

Anal. calc. for $C_{41}H_{50}Hf$: C, 68.27; H, 6.99. Found: C, 68.44; H, 7.21.

$^1$H NMR (CDCl$_3$): δ 8.08 (d, J=8.9 Hz, 1H), 7.99 (d, J=8.6 Hz, 1H), 7.81 (dm, J=7.8 Hz, 1H), 7.62-7.57 (m, 2H), 7.51 (dd, J=8.9 Hz, J=1.2 Hz, 1H), 7.50-7.44 (m, 1H), 7.39-7.30 (m, 3H), 6.28-6.21 (m, 1H), 6.15-6.08 (m, 1H), 6.03 (s, 1H), 5.74 (ddt, J=17.1 Hz, J=10.3 Hz, J=6.6 Hz, 1H), 5.64-5.59 (m, 1H), 5.35-5.28 (m, 1H), 4.92 (dm, J=17.2 Hz, 1H), 4.87 (dm, J=10.0 Hz, 1H), 2.94-2.79 (m, 1H), 2.63-2.48 (m, 1H), 2.11-1.92 (m, 2H), 1.60-1.41 (m, 4H), 1.38 (s, 9H), 0.97 (s, 9H), −1.76 (s, 3H), −1.90 (s, 3H). $^{13}$C{$^1$H} NMR (CDCl$_3$): δ 150.29, 147.84, 144.27, 138.66, 130.71, 128.09, 127.97, 127.25, 126.67, 124.53, 123.78, 122.91, 122.76, 121.05, 120.67, 119.15, 117.55, 116.38, 115.88, 114.43, 112.91, 111.14, 109.56, 100.99, 100.60, 76.51, 53.51, 41.07, 38.18, 37.42, 35.36, 34.77, 33.88, 31.38, 30.77, 29.61, 23.79.

Complex 3 (C-3)

(Phenyl)(3-buten-1-yl)methylene(cyclopentadienyl)(2,7-di-tert-butylfluoren-9-yl) hafnium dimethyl Step 1: 1-Phenylpent-4-en-1-one Method A

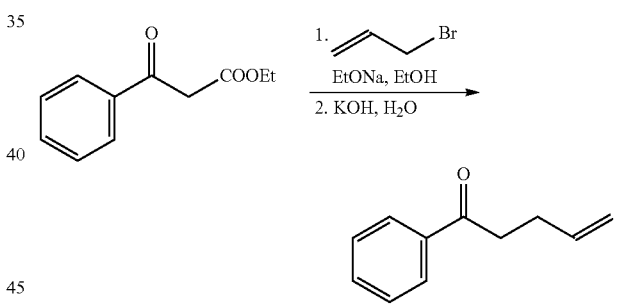

To a solution of sodium ethoxide, obtained from 7.9 g (343.6 mmol) of sodium metal and 235 ml of dry ethanol, 67.27 g (350 mmol) of ethyl benzoyl acetate was added. The formed mixture was stirred for 15 min, and then 42.37 g (350 mmol) of allyl bromide was added dropwise at such a rate to maintain a temperature below 40° C. The resulting mixture was refluxed for 3 h and then cooled to room temperature. A solution of 37 g of KOH in 120 ml of water was added. The resulting light-orange homogeneous mixture was refluxed for 5 h leading eventually to biphasic system. After cooling to room temperature, the reaction mixture was carefully treated with 4 M HCl to slightly acidic pH (Caution! Strong gas evolution!). The resulting mixture was diluted with 700 ml of water and then extracted with 3×200 ml of ether. The combined ethereal extract was washed with a solution of 30 g of KOH in 300 ml of water, dried over $K_2CO_3$, passed through a short pad of silica gel 60 (40-63 μm), and then evaporated to dryness. The residue was distilled in vacuum to give 41.58 g (74%; purity ca. 95%) of 1-phenylpent-4-en-1-one, b.p. 73-81° C./6 mm Hg.

Method B

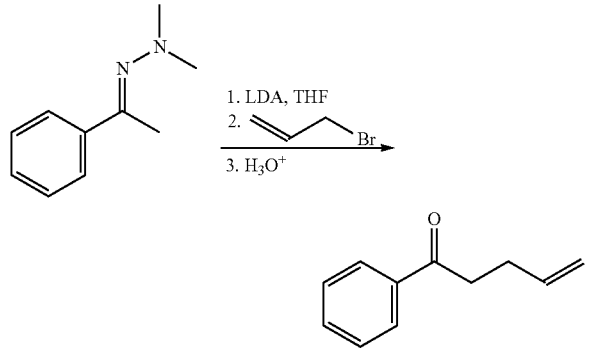

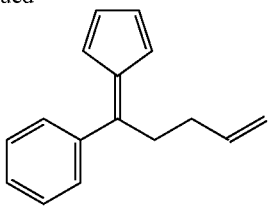

To a solution of lithium diisopropylamide (prepared from a solution of 27.83 g (275.0 mmol) of diisopropylamine in 400 ml of THF and 110 ml (275.0 mmol) of 2.5 M ⁿBuLi in hexanes at −78° C.) a solution of 40.56 g (250 mmol) of acetophenone N,N-dimethylhydrazone in 60 ml of THF was added over 30 min at 0° C. This mixture was stirred for 4 h at 0° C., then cooled to −78° C., and a solution of 36.3 g (300 mmol) of 3-bromoprop-1-ene in 45 ml of THF was added over 30 min. The reaction was slowly warmed to room temperature and then stirred overnight at this temperature. The resulting solution was evaporated to dryness in vacuum, and the residue was diluted with 400 ml of ether. This solution cooled to 0° C. (an ice-bath) was treated with an ice-cold solution of 120 ml of 96% sulfuric acid in 900 ml of water for 30 min. After stirring this mixture for 30 min at room temperature, the organic layer was separated, and the aqueous one was extracted with 2×200 ml of ether. The combined organic extract was washed with 2×200 ml of water, dried over $Na_2SO_4$ and concentrated under a reduced pressure. The product was isolated by flash-chromatography on silica gel 60 (40-63 μm; eluent: hexane-ethyl acetate=97:3, vol.). This procedure gave 40.5 g (ca. 100%) of 1-phenylpent-4-en-1-one as a colorless liquid.

Anal. calc. for $C_{11}H_{12}O$: C, 82.46; H, 7.55. Found: C, 82.70; H, 7.63.

$^1H$ NMR ($CDCl_3$): δ 7.99-7.91 (m, 2H), 7.56-7.51 (m, 1H), 7.47-7.40 (m, 2H), 5.90 (ddt, J=17.0 Hz, J=10.2 Hz, J=6.5 Hz, 1H), 5.08 (ddt, J=17.0 Hz, J=1.6 Hz, J=1.6 Hz, 1H), 5.00 (ddt, J=10.2 Hz, J=1.6 Hz, J=1.6 Hz, 1H), 3.05 (t, J=7.4 Hz, 2H), 2.53-2.45 (m, 2H). $^{13}C\{^1H\}$ NMR ($CDCl_3$): δ 199.15, 137.16, 136.81, 132.83, 128.43, 127.86, 115.12, 37.57, 27.99

Step 2: 6-Phenyl-6-(but-3-en-1-yl)fulvene

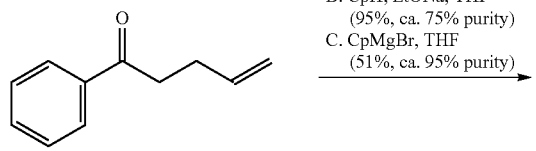

A. CpH, EtONa, EtOH (93%, ca. 75% purity)
B. CpH, EtONa, THF (95%, ca. 75% purity)
C. CpMgBr, THF (51%, ca. 95% purity)

Method A

To a solution of sodium ethoxide obtained from 3.42 g (148.8 mmol) of sodium metal and 120 ml of dry ethanol, 23.7 g (147.9 mmol) of 1-phenylpent-4-en-1-one, obtained according to method A in step 1, was added. The formed mixture was cooled to 0° C., and then 25 ml of freshly cracked cyclopenta-1,3-diene was added dropwise over 40 min. The resulting mixture was stirred at room temperature for 4 h. The red reaction mixture was poured into 200 ml of water, and the formed mixture was extracted with 3×100 ml of n-hexane. The combined organic extract was dried over anhydrous $K_2CO_3$ and then evaporated to dryness to give a red oily liquid. Crude product was purified by flash chromatography on silica gel 60 (300 ml, 40-63 μm; eluent: hexane/EtOAc=30/1, vol.) to give 29.17 g (93%, ca. 75% purity) of 6-phenyl-6-(but-3-en-1-yl)fulvene as a red oily liquid.

Method B

To a cooled to 0° C. solution of 10.2 g (149.9 mmol) of sodium ethoxide in 100 ml of THF, 23.5 g (146.7 mmol) of 1-phenylpent-4-en-1-one, obtained according to method A in step 1, was added. Then, 25 ml of freshly cracked cyclopenta-1,3-diene was added dropwise over 40 min. The resulting mixture was stirred at room temperature for 4 h. To the dark-red reaction mixture 5 ml of water was added, and the resulting mixture was passed through a short pad of silica gel 60 (40-63 μm). The filtrate was dried over anhydrous $K_2CO_3$ and then evaporated to dryness to give a red oily liquid. Crude product was purified by flash chromatography on silica gel 60 (300 ml, 40-63 μm; eluent: hexane/ethyl acetate=30/1, vol.) to give 29.78 g (95%, ca. 75% purity) of 6-phenyl-6-(but-3-en-1-yl)fulvene as a red oily liquid.

Method C

To a solution of 41.0 g (255.9 mmol) of 1-phenylpent-4-en-1-one, obtained according to method B in step 1, in 100 ml of THF, cooled in an ice-bath, a solution of 55.0 g (324.9 mmol, 1.27 equiv.) of cyclopentadienyl magnesium bromide in 300 ml of THF was added dropwise. The resulting mixture was refluxed for 3 h, then stirred overnight at room temperature, finally, cooled in an ice-bath and quenched with 10% HCl to pH-5-6. This mixture was extracted with 4×250 ml of hexane, and the combined organic extract was dried over $Na_2SO_4$. Removal of the solvent under vacuum gave a dark-red oil. The product was isolated by flash-chromatography on silica gel 60 (40-63 μm; eluent: hexane-ethyl acetate=100:1, vol.). This procedure gave 26.98 g (51%, ca. 95% purity) of 6-phenyl-6-(but-3-en-1-yl)fulvene as a red oily liquid.

Anal. calc. for $C_{16}H_{16}$: C, 92.26; H, 7.74. Found: C, 92.39; H, 7.88.

$^1H$ NMR ($CDCl_3$): δ 7.40-7.30 (m, 5H), 6.62 (ddd, J=5.3 Hz, J=2.0 Hz, J=1.5 Hz, 1H), 6.56 (ddd, J=5.3 Hz, J=2.0 Hz, J=1.5 Hz, 1H), 6.47 (ddd, J=5.3 Hz, J=2.0 Hz, J=1.5 Hz, 1H), 6.10 (ddd, J=5.3 Hz, J=2.0 Hz, J=1.5 Hz, 1H), 5.76 (ddt, J=17.0 Hz, J=10.3 Hz, J=6.6 Hz, 1H), 5.00-4.91 (m, 2H), 2.99 (t, J=7.7 Hz, 2H), 2.20-2.12 (m, 2H).

Step 3: (Phenyl)(3-buten-1-yl)methylene(cyclopentadienyl)(2,7-di-tert-butylfluoren-9-yl) hafnium dichloride Method A

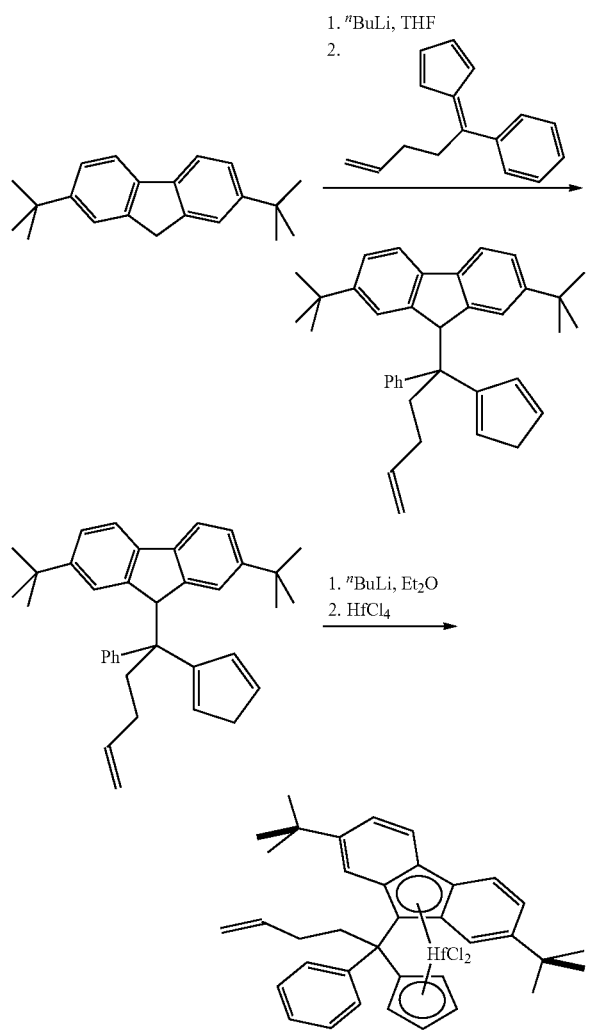

To a solution of 14.07 g (50.53 mmol) of 2,7-di-tert-butylfluorene in 200 ml of THF cooled to −50° C., 20.2 ml (50.5 mmol) of 2.5 M $^n$BuLi in hexanes was added in one portion. This mixture was stirred overnight at room temperature, then cooled to −50° C., and a solution of 11.55 g (55.45 mmol) of 6-phenyl-6-(but-3-en-1-yl)fulvene, obtained according to method C in step 2, in 200 ml of THF was added in one portion. After stirring overnight at room temperature the formed dark-red reaction mixture was cooled in an ice-bath and then quenched with a solution of 5 ml of 12 M HCl in 200 ml of water to pH-5-6. The resulting yellow mixture was extracted with 400 ml of dichloromethane. The organic layer was separated, and the aqueous one was extracted with 150 ml of dichloromethane. The combined organic extract was dried over Na$_2$SO$_4$ and then filtered through a pad of silica gel 60 (40-63 μm) which was additionally washed by 2×50 ml of dichloromethane. Removal of the solvents under vacuum gave an orange oil which was dried in vacuo to afford 25.7 g of 1-phenyl-1-(but-3-en-1-yl)-1-cyclopentadienyl-1-(2,7-di-tert-butylfluorenyl)methane which was further used without an additional purification. To a yellowish solution of 13.78 g (28.31 mmol) of 1-phenyl-1-(but-3-en-1-yl)-1-cyclopentadienyl-1-(2,7-di-tert-butylfluorenyl)methane in 170 ml of ether cooled to −78° C., 22.7 ml (56.8 mmol) of 2.5 M $^n$BuLi in hexanes was added in one portion. This mixture was stirred for 5 h at room temperature. To the resulting orange suspension cooled to −50° C. 9.07 g (28.32 mmol) of HfCl$_4$ was added. The formed mixture was stirred for 24 h at room temperature and then evaporated to dryness. The residue was stirred with 200 ml of warm toluene, and the formed suspension was filtered through a glass frit (G4). The filtrate was evaporated to ca. 20 ml, the orange solid precipitated from this solution was filtered off (G3), washed with 3×10 ml of a mixture of toluene and hexane (1:2, vol.), and then dried in vacuum. This procedure gave 8.7 g (42%) of (phenyl)(3-buten-1-yl)methylene(cyclopentadienyl)(2,7-di-tert-butylfluoren-9-yl) hafnium dichloride.

Method B

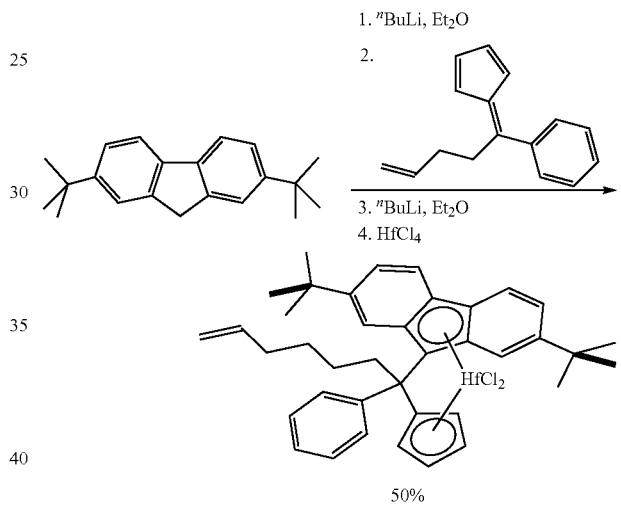

To a solution of 13.92 g (50.0 mmol) of 2,7-di-tert-butylfluorene in 200 ml of ether, cooled to −50° C., 20.6 ml (50.0 mmol) of 2.43 M $^n$BuLi in hexanes was added in one portion. This mixture was stirred for 4 h at room temperature. The resulting orange solution was cooled to −50° C., and 11.09 g (53.2 mmol) of 6-phenyl-6-(but-3-en-1-yl) fulvene, obtained according to method C in step 2, was added in one portion. After stirring overnight at room temperature the orange reaction mixture was cooled to −50° C., and then 20.6 ml (50.0 mmol) of 2.43 M $^n$BuLi in hexanes was added in one portion. This mixture was stirred for 6 h at room temperature. The resulting dark-red solution with a significant amount of brick red precipitate was cooled to −50° C., and 16.02 g (50.02 mmol) of HfCl$_4$ was added. The formed mixture was stirred for 24 h at room temperature. Orange precipitate was filtered, heated with 250 ml of toluene, filtered again from LiCl, and mother liquor was evaporated almost to dryness. 50 ml of n-hexane was added to the residue and the precipitated orange powder was filtered off (G3) and dried in vacuum. This procedure gave 16.7 g of (phenyl)(3-buten-1-yl)methylene(cyclopentadienyl)(2,7-di-tert-butylfluoren-9-yl) hafnium dichloride. The ethereal mother liquor (from the reaction mixture) was evaporated almost to dryness, and the residue was triturated with 25 ml of n-hexane. Orange precipitate was filtered off (G3) to give 3.5 g of the target complex. Thus, the total yield of (phenyl)(3-buten-1-yl)methylene(cyclopentadienyl)(2,7-di-tert-butylfluoren-9-yl) hafnium dichloride isolated in this synthesis was 20.2 g (55%).

Anal. calc. for $C_{37}H_{40}Cl_2Hf$: C, 60.54; H, 5.49. Found: C, 60.32; H, 5.66.

$^1$H NMR (CDCl$_3$): δ 8.02 (d, J=8.9 Hz, 1H), 7.96 (d, J=8.9 Hz, 1H), 7.85 (dm, J=7.6 Hz, 1H), 7.69 (s, 1H), 7.66-7.61 (m, 2H), 7.61-7.54 (m, 1H), 7.51 (dd, J=8.9 Hz, J=1.5 Hz, 1H), 7.46-7.38 (m, 2H), 6.36-6.32 (m, 1H), 6.23-6.19 (m, 1H), 6.15 (s, 1H), 5.99-5.86 (m, 1H), 5.81-5.77 (m, 1H), 5.55-5.51 (m, 1H), 5.11 (dd, J=17.2 Hz, J=1.5 Hz, 1H), 5.06 (dd, J=10.3 Hz, J=1.5 Hz, 1H), 3.29-3.19 (m, 1H), 2.81-2.70 (m, 1H), 2.43-2.26 (m, 2H), 1.38 (s, 9H), 0.99 (s, 9H). $^{13}$C{$^1$H} NMR (CDCl$_3$): δ 152.39, 149.63, 142.90, 137.61, 130.60, 128.68, 128.29, 127.40, 127.07, 124.33, 124.16, 124.05, 123.55, 122.49, 120.18, 119.86, 119.65, 118.84 (two resonances), 117.77, 116.65, 115.23, 114.34, 99.61, 99.57, 77.31, 53.42, 39.89, 35.49, 34.87, 31.14, 30.52, 28.27.

Step 4: (Phenyl)(3-buten-1-yl)methylene(cyclopentadienyl)(2,7-di-tert-butylfluoren-9-yl) hafnium dimethyl

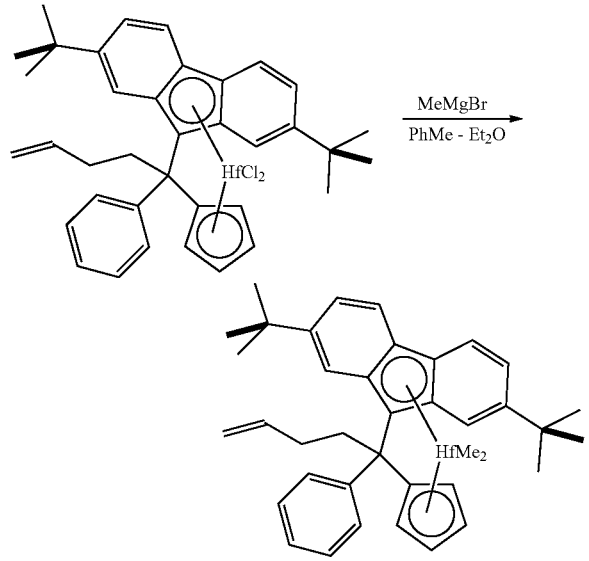

To a solution of 3.67 g (5.0 mmol) of (phenyl)(3-buten-1-yl)methylene(cyclopentadienyl)(2,7-di-tert-butylfluoren-9-yl) hafnium dichloride, obtained according to method A in step 3, in a mixture of 50 ml of toluene and 50 ml of ether 7.0 ml (14.77 mmol) of 2.11 M MeMgBr in ether was added. The resulting mixture was refluxed for 30 min and then evaporated to ca. 25 ml. The obtained solution was heated to 80-90° C., and the obtained suspension was filtered while hot through glass frit (G3) to remove insoluble magnesium salts. The filter cake was additionally washed with 2×20 ml of toluene. The combined filtrate was evaporated almost to dryness, and 20 ml of hexane was added to the residue. The resulting mixture was filtered once again through a glass frit (G4). The mother liquor was evaporated to dryness, and the residue was dissolved in 7 ml of hexane. Yellow powder precipitated from this solution overnight at −40° C. was collected and dried in vacuum. This procedure gave 3.18 g (92%) of pure (phenyl)(3-buten-1-yl)methylene(cyclopentadienyl) (2,7-di-tert-butylfluoren-9-yl) hafnium dimethyl complex.

Anal. calc. for $C_{39}H_{46}Hf$: C, 67.57; H, 6.69. Found: C, 67.82; H, 6.85.

$^1$H NMR (CDCl$_3$): δ 8.08 (d, J=8.9 Hz, 1H), 8.00 (d, J=8.9 Hz, 1H), 7.83 (dm, J=7.9 Hz, 1H), 7.63-7.56 (m, 2H), 7.53-7.45 (m, 2H), 7.39-7.31 (m, 3H), 6.28-6.22 (m, 1H), 6.14-6.10 (m, 1H), 6.05 (s, 1H), 5.95-5.83 (m, 1H), 5.67-5.62 (m, 1H), 5.34-5.29 (m, 1H), 5.07 (dd, J=17.2 Hz, J=1.5 Hz, 1H), 5.01 (dd, J=10.2 Hz, J=1.5 Hz, 1H), 3.12-2.98 (m, 1H), 2.62-2.49 (m, 1H), 2.33-2.15 (m, 2H), 1.37 (s, 9H), 0.98 (s, 9H), −1.76 (s, 3H), −1.90 (s, 3H). $^{13}$C{$^1$H} NMR (CDCl$_3$): δ 150.44, 147.83, 143.87, 138.19, 130.77, 128.26, 127.92, 127.20, 126.82, 124.38, 123.76, 122.94, 122.66, 121.16, 120.70, 119.09, 117.45, 116.37, 115.88, 114.73, 112.91, 111.16, 109.34, 100.91, 100.51, 75.97, 53.23, 39.73, 38.29, 37.49, 35.39, 34.76, 31.39, 30.75, 28.39.

Complex 4 (C-4)

(Phenyl)(pent-4-en-1-yl)methylene(cyclopentadienyl)(2,7-di-tert-butylfluoren-9-yl)hafnium dimethyl Step 1: 1-Phenylhex-5-en-1-one

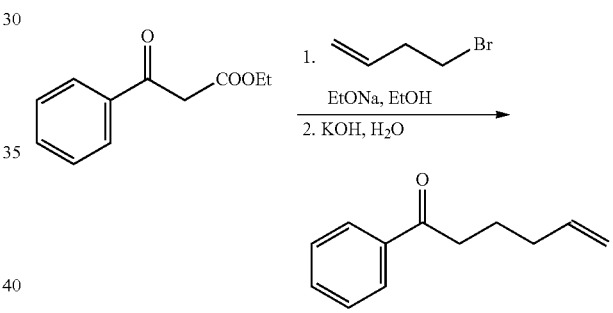

To a solution of sodium ethoxide, obtained from 5.75 g (0.25 mol) of sodium metal and 175 ml of dry ethanol, 48.05 g (0.25 mol) of ethyl benzoyl acetate was added. The formed mixture was stirred for 10 min, then 42.5 g (314.8 mmol) of 4-bromobut-1-ene was added, and the resulting mixture was refluxed for 5 h. Further on, the reaction mixture was cooled to room temperature, and a solution of 37 g of KOH in 120 ml of water was added. The resulting mixture was refluxed for 5 h. After cooling to room temperature, the reaction mixture was carefully treated with 4 M HCl to slightly acidic pH (Caution! Strong gas evolution!). The resulting mixture was diluted with 700 ml of water and extracted with 3×250 ml of ether. The combined ethereal extract was washed with a solution of 20 g of KOH in 200 ml of water, dried over K$_2$CO$_3$, passed through a short pad of silica gel 60 (40-63 μm), and then evaporated to dryness. The residue was distilled in vacuum to give 25.91 g (60%; purity ca. 95%) of 1-phenylhex-5-en-1-one, b.p. 95-105° C./6 mm Hg.

$^1$H NMR (CDCl$_3$): δ 8.00-7.90 (m, 2H), 7.58-7.50 (m, 1H), 7.50-7.39 (m, 2H), 5.82 (ddt, J=17.1 Hz, J=10.2 Hz, J=6.7 Hz, 1H), 5.05 (dm, J=17.1 Hz, 1H), 4.99 (dm, J=10.2 Hz, 1H), 2.97 (t, J=7.3 Hz, 2H), 2.16 (td, J=7.3 Hz, J=6.7 Hz, 2H), 1.85 (quin, J=7.3 Hz, 2H). $^{13}$C{$^1$H} NMR (CDCl$_3$): δ 200.09, 137.98, 137.01, 132.82, 128.47, 127.94, 115.20, 37.61, 33.11, 23.23.

23

Step 2: 6-Phenyl-6-(pent-4-en-1-yl)fulvene

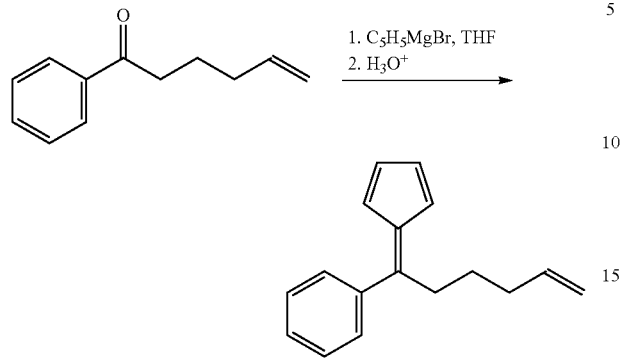

To a solution of 17.4 g (100 mmol) of 1-phenylhex-5-en-1-one in 40 ml of THF cooled in an ice-bath a solution of 20.3 g (120 mmol, 1.2 equiv.) of cyclopentadienylmagnesium bromide in 120 ml of THF was added dropwise. The resulting mixture was refluxed for 3 h, then stirred overnight at room temperature, finally, cooled in an ice-bath and quenched with 10% HCl to pH-5-6. This mixture was extracted with 3×150 ml of hexane, and the combined organic extract was dried over $Na_2SO_4$. Removal of the solvent under vacuum gave a dark-red oil. The product was isolated by flash-chromatography on silica gel 60 (40-63 μm; eluent: hexane-ethyl acetate=100:1, vol.). This procedure gave 10.23 g (46%) of 6-phenyl-6-(pent-4-en-1-yl)fulvene as a red oil.

Anal. calc. for $C_{17}H_{13}$: C, 91.84; H, 8.16. Found: C, 92.11; H, 8.35.

$^1$H NMR (CDCl$_3$): δ 7.41-7.29 (m, 5H), 6.62 (ddd, J=5.3 Hz, J=1.9 Hz, J=1.5 Hz, 1H), 6.56 (ddd, J=5.3 Hz, J=1.9 Hz, J=1.5 Hz, 1H), 6.47 (ddd, J=5.3 Hz, J=1.9 Hz, J=1.5 Hz, 1H), 6.10 (ddd, J=5.3 Hz, J=1.9 Hz, J=1.5 Hz, 1H), 5.73 (ddt, J=17.1 Hz, J=10.3 Hz, J=6.7 Hz, 1H), 5.01-4.90 (m, 2H), 2.92 (t, J=7.7 Hz, 2H), 2.09-2.00 (m, 2H), 1.52 (quin, J=7.7 Hz, 2H). $^{13}$C{$^1$H} NMR (CDCl$_3$): δ 154.28, 143.47, 140.68, 138.01, 131.83, 131.46, 129.43, 128.05, 127.79, 123.83, 120.93, 115.01, 35.57, 33.37, 28.63.

Step 3: (Phenyl)(pent-4-en-1-yl)methylene(cyclopentadienyl)(2,7-di-tert-butylfluoren-9-yl)hafnium dichloride

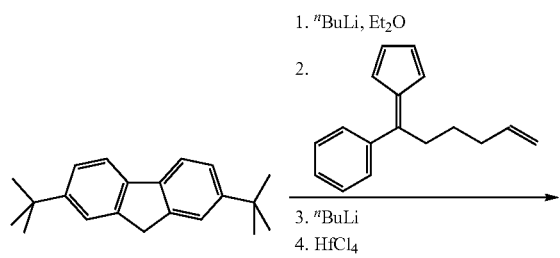

24

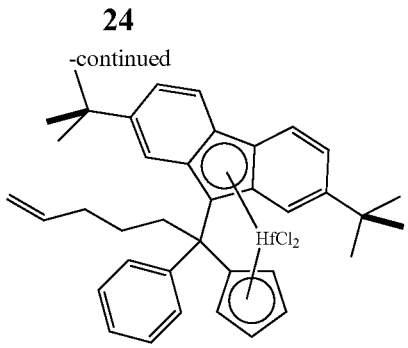

To a solution of 12.81 g (46.01 mmol) of 2,7-di-tert-butylfluorene in 250 ml of ether cooled to −50° C. 19 ml (46.17 mmol) of 2.43 M $^n$BuLi in hexanes was added in one portion. This mixture was stirred overnight at room temperature. The resulting orange solution was cooled to −50° C., and a solution of 10.23 g (46.01 mmol) of 6-phenyl-6-(pent-4-en-1-yl)fulvene in 150 ml of ether was added in one portion. After stirring overnight at room temperature the dark-red reaction mixture was cooled to −50° C., and 19 ml (46.17 mmol) of 2.43 M $^n$BuLi in hexanes was added in one portion. This mixture was stirred overnight at room temperature. The resulting dark-red solution with a significant amount of brick red precipitate was cooled to −50° C., and 14.74 g (46.02 mmol) of HfCl$_4$ was added. The formed mixture was stirred for 24 h at room temperature, then it was evaporated to dryness, and the residue was treated with 100 ml of hot toluene. This mixture was filtered while hot through glass frit (G4), and the filtrate was evaporated to dryness. The residue was triturated with 100 ml of n-hexane, the precipitated orange powder was filtered off (G3) and then dried in vacuum. This procedure gave 10.1 g of (phenyl)(pent-4-en-1-yl)methylene(cyclopentadienyl)(2,7-di-tert-butylfluoren-9-yl)hafnium dichloride. The mother liquor was evaporated to ca. 50 ml, the precipitated orange solid was filtered off and then dried in vacuum. This procedure gave extra 3.82 g of target complex. Thus, the total yield of (phenyl)(pent-4-en-1-yl)methylene(cyclopentadienyl)(2,7-di-tert-butylfluoren-9-yl)hafnium dichloride isolated in this synthesis was 13.92 g (40%).

Anal. calc. for $C_{38}H_{42}Cl_2Hf$: C, 61.01; H, 5.66. Found: C, 61.14; H, 5.82.

$^1$H NMR (CDCl$_3$): δ 8.01 (d, J=8.9 Hz, 1H), 7.95 (d, J=8.9 Hz, 1H), 7.83 (br.d, J=7.7 Hz, 1H), 7.73 (s, 1H), 7.67-7.59 (m, 2H), 7.59-7.52 (m, 1H), 7.49 (d, J=8.8 Hz, 1H), 7.45-7.38 (m, 2H), 6.34 (br.s, 1H), 6.21 (br.s, 1H), 6.10 (s, 1H), 5.86-5.70 (m, 2H), 5.55 (br.s, 1H), 5.05 (br.d, J=17.1 Hz, 1H), 5.00 (br.d, J=10.3 Hz, 1H), 3.01-2.87 (m, 2H), 2.34-2.21 (m, 1H), 2.19-2.06 (m, 1H), 1.75-1.48 (m, 2H), 1.39 (s, 9H), 0.98 (s, 9H). $^{13}$C{$^1$H} NMR (CDCl$_3$): δ 152.19, 149.66, 143.23, 138.17, 130.20, 128.67, 128.37, 127.26, 127.15, 124.21, 124.05, 123.52, 122.64, 120.26, 119.89, 119.57, 118.89, 118.81, 117.98, 116.72, 115.46, 114.15, 99.74, 99.68, 53.64, 40.32, 35.44, 34.86, 34.02, 31.13, 30.52, 23.41.

Step 4: (Phenyl)(pent-4-en-1-yl)methylene(cyclopentadienyl)(2,7-di-tert-butylfluoren-9-yl)hafnium dimethyl

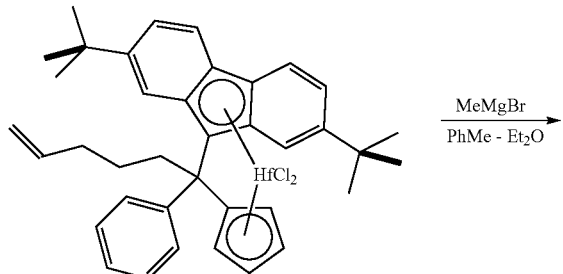

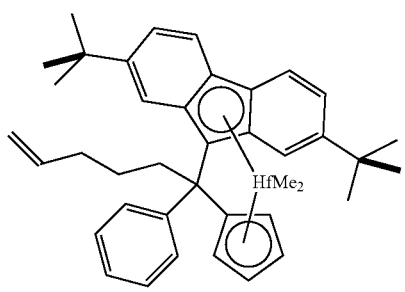

To a solution of 5.24 g (7.0 mmol) of (phenyl)(pent-4-en-1-yl)methylene(cyclopentadienyl)(2,7-di-tert-butylfluoren-9-yl)hafnium dichloride in a mixture of 50 ml of toluene and 15 ml of ether, 10 ml (27 mmol) of 2.7 M MeMgBr in ether was added. The resulting mixture was stirred overnight at room temperature. Most of ether was distilled off, and the resulting mixture was filtered through glass frit (G4) to remove insoluble magnesium salts. The filtrate was evaporated almost to dryness, the residue was dissolved in 30 ml of n-hexane, the formed suspension was filtered through glass frit (G3), and the mother liquor was evaporated to ca. 10 ml. Yellow powder precipitated from this solution overnight at −30° C. was collected and dried in vacuum. This procedure gave 1.17 g of (phenyl)(pent-4-en-1-yl)methylene(cyclopentadienyl)(2,7-di-tert-butylfluoren-9-yl)hafnium dimethyl. The mother liquor was evaporated to ca. 5 ml. Yellow powder precipitated from this solution overnight at −30° C. was collected and dried in vacuum to give extra 1.03 g of the target complex. Thus, the total yield of (phenyl)(pent-4-en-1-yl)methylene(cyclopentadienyl)(2,7-di-tert-butylfluoren-9-yl)hafnium dimethyl isolated in this synthesis was 2.21 g (44%). The analogous synthesis starting from 8.65 g of (phenyl)(pent-4-en-1-yl)methylene(cyclopentadienyl)(2,7-di-tert-butylfluoren-9-yl)hafnium dichloride afforded (phenyl)(pent-4-en-1-yl)methylene(cyclopentadienyl)(2,7-di-tert-butylfluoren-9-yl)hafnium dimethyl in 64% yield.

Anal. calc. for $C_{40}H_{50}Hf$: C, 67.92; H, 6.84. Found: C, 67.84; H, 6.99.

$^1$H NMR (CDCl$_3$): δ 8.08 (d, J=8.9 Hz, 1H), 7.99 (d, J=8.8 Hz, 1H), 7.81 (dm, J=7.7 Hz, 1H), 7.64-7.57 (m, 2H), 7.53-7.44 (m, 2H), 7.39-7.31 (m, 3H), 6.27-6.23 (m, 1H), 6.14-6.10 (m, 1H), 6.00 (br.d, J=0.8 Hz, 1H), 5.76 (ddt, J=17.1 Hz, J=10.1 Hz, J=6.8 Hz, 1H), 5.63-5.57 (m, 1H), 5.36-5.30 (m, 1H), 5.01 (dm, J=17.1 Hz, 1H), 4.96 (dm, J=10.1 Hz, 1H), 2.82-2.67 (m, 2H), 2.28-2.16 (m, 1H), 2.13-2.01 (m, 1H), 1.66-1.40 (m, 2H), 1.38 (s, 9H), 0.97 (s, 9H), −1.77 (s, 3H), −1.91 (s, 3H). $^{13}$C{$^1$H} NMR (CDCl$_3$): δ 150.24, 147.84, 144.25, 138.51, 130.42, 128.29, 127.96, 127.31, 126.68, 124.56, 123.76, 122.90, 122.77, 121.04, 120.67, 119.05, 117.69, 116.37, 115.86, 115.08, 112.90, 111.16, 109.23, 101.03, 100.63, 76.68, 53.46, 40.31, 38.15, 37.43, 35.35, 34.76, 34.19, 31.40, 30.76, 23.52.

Complex for Comparison (CC-1)

(Phenyl)(5-hexen-1-yl)methylene(cyclopentadienyl)(2,7-di-tert-butylfluoren-9-yl) zirconium dichloride

Step 1: 1-Phenyl-1-(hex-5-en-1-yl)-1-cyclopentadienyl-1-(2,7-di-tert-butylfluorenyl)methane 1. $^n$BuLi, THF

2.

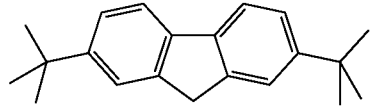
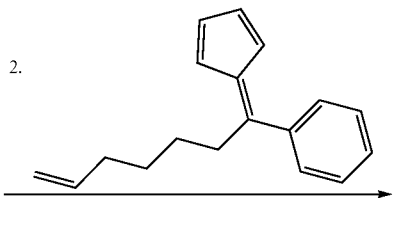

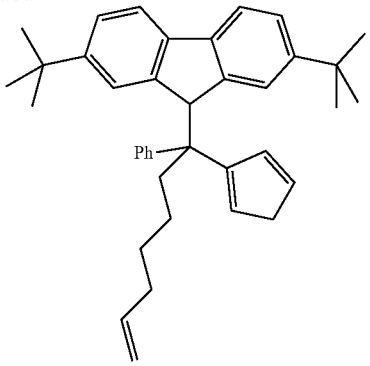

To a solution of 13.92 g (50.0 mmol) of 2,7-di-tert-butylfluorene in 170 ml of THF cooled to −78° C. 20.0 ml (50.0 mmol) of 2.5 M ″BuLi in hexanes was added in one portion. This mixture was stirred overnight at room temperature. The resulting light-orange solution was cooled to −50° C., and a solution of 12.44 g (52.6 mmol, 1.05 eq) of 6-phenyl-6-(hex-5-en-1-yl)fulvene in 170 ml of THF was added in one portion. After stirring overnight at room temperature the dark-red reaction mixture was cooled in an ice-bath and then quenched with 10% HCl to a slightly acidic pH. The resulting orange mixture was diluted with 400 ml of water and extracted with 500 ml of diethyl ether. The organic layer was separated, and the aqueous one was extracted with 150 ml of dichloromethane. The combined organic extract was dried over $Na_2SO_4$ and filtered through a pad of silica gel 60 (40-63 μm) which was additionally washed by 2×50 ml of dichloromethane. Removal of the solvents under vacuum gave semicrystalline yellow mass which was triturated with 50 ml of n-hexane, filtered off and dried in vacuo to afford 16.62 g of 1-phenyl-1-(hex-5-en-1-yl)-1-cyclopentadienyl-1-(2,7-di-tert-butylfluorenyl)methane as a white solid. The mother liquor was evaporated to dryness, and the residue was dissolved in 100 ml of hot n-hexane. Solid precipitated from this solution overnight at −30° C. was filtered off, washed with 30 ml of cold n-hexane, and dried in vacuo. This procedure gave 7.82 g of a slightly yellow solid of the title product as a mixture of isomers. Thus, the total yield of 1-phenyl-1-(hex-5-en-1-yl)-1-cyclopentadienyl-1-(2,7-di-tert-butylfluorenyl)methane isolated in this synthesis was 24.44 g (94.8%).

Anal. calc. for $C_{39}H_{46}$: C, 90.99; H, 9.01. Found: C, 91.15; H, 9.20.

$^1$H NMR (CDCl$_3$): δ 7.57-6.95 (m, 11H), 6.34-5.59 (m, 4H), 4.98-4.70 (m, 3H), 2.93-2.55 (m, 2H), 2.49-2.15 (m, 2H), 2.04-1.80 (m, 2H), 1.46-0.91 (m, 22H).

Step 2: (Phenyl)(5-hexen-1-yl)methylene(cyclopentadienyl)(2,7-di-tert-butylfluoren-9-yl) zirconium dichloride

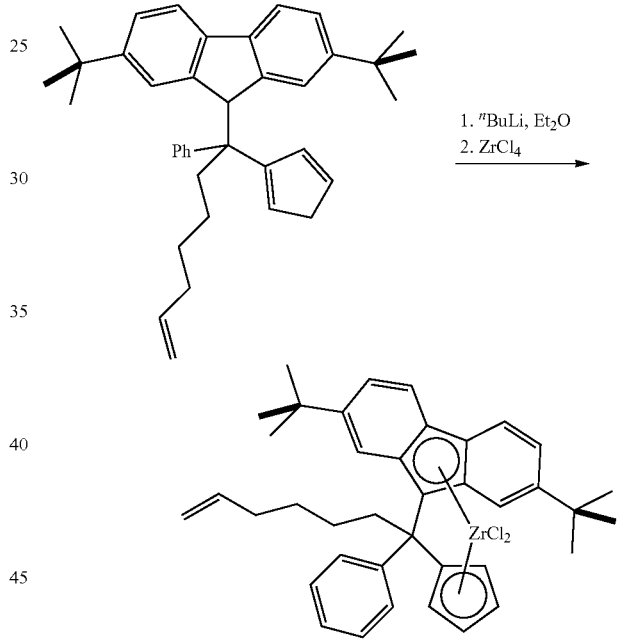

To a solution of 16.51 g (32.07 mmol) of 1-phenyl-1-(hex-5-en-1-yl)-1-cyclopentadienyl-1-(2,7-di-tert-butylfluorenyl)methane in 300 ml of ether, cooled to −50° C., 25.7 ml (64.25 mmol) of 2.5 M ″BuLi in hexanes was added in one portion. This mixture was stirred overnight at room temperature. The resulting yellow solution with yellow precipitate was cooled to −50° C., and 7.48 g (32.1 mmol) of ZrCl$_4$ was added. The resulting mixture was stirred for 24 h at room temperature and then evaporated to dryness. The residue was stirred with 150 ml of warm toluene, and the formed suspension was filtered through a glass frit (G4). The filtrate was evaporated to ca. 40 ml, and 70 ml of n-hexane was added. Red solid precipitated overnight at −30° C. was collected and dried in vacuum. This procedure gave 19.7 g (91%) of (Phenyl)(5-hexen-1-yl)methylene(cyclopentadienyl)(2,7-di-tert-butylfluoren-9-yl) zirconium dichloride as 1 to 1 solvate with toluene.

Anal. calc. for $C_{39}H_{44}Cl_2Zr*C_7H_8$: C, 72.03; H, 6.83. Found: C, 72.24; H, 7.09.

$^1$H NMR (CDCl$_3$): δ 8.04 (d, J=8.7 Hz, 1H), 7.98 (d, J=8.7 Hz, 1H), 7.82 (dm, J=7.7 Hz, 1H), 7.67 (s, 1H), 7.66 (dd, J=9.4 Hz, J=1.4 Hz, 1H), 7.64-7.60 (m, 1H), 7.59-7.51 (m, 2H), 7.44-7.38 (m, 2H), 6.41-6.37 (m, 1H), 6.28-6.24 (m, 1H), 6.09 (m, 1H), 5.84-5.80 (m, 1H), 5.80-5.68 (m, 1H), 5.59-5.55 (m, 1H), 4.97-4.86 (m, 2H), 3.10-2.97 (m, 1H), 2.82-2.69 (m, 1H), 2.15-1.96 (m, 2H), 1.64-1.44 (m, 4H), 1.39 (s, 9H), 0.98 (s, 9H). $^{13}$C{$^1$H} NMR (CDCl$_3$): δ 152.50, 149.95, 143.09, 138.34, 130.47, 128.56, 128.36, 127.26, 127.09, 124.58, 124.32, 124.29, 123.84, 123.63, 121.45, 121.38, 120.51, 120.03, 119.77, 118.32, 117.64, 114.67, 111.87, 102.14, 77.73, 53.80, 40.88, 35.48, 34.90, 33.76, 31.11, 30.50, 29.43, 23.57

Complex for Comparison (CC-2)

(Phenyl)(hex-5-en-1-yl)methylene(cyclopentadienyl) (2,7-di-tert-butylfluoren-9-yl) zirconium dimethyl

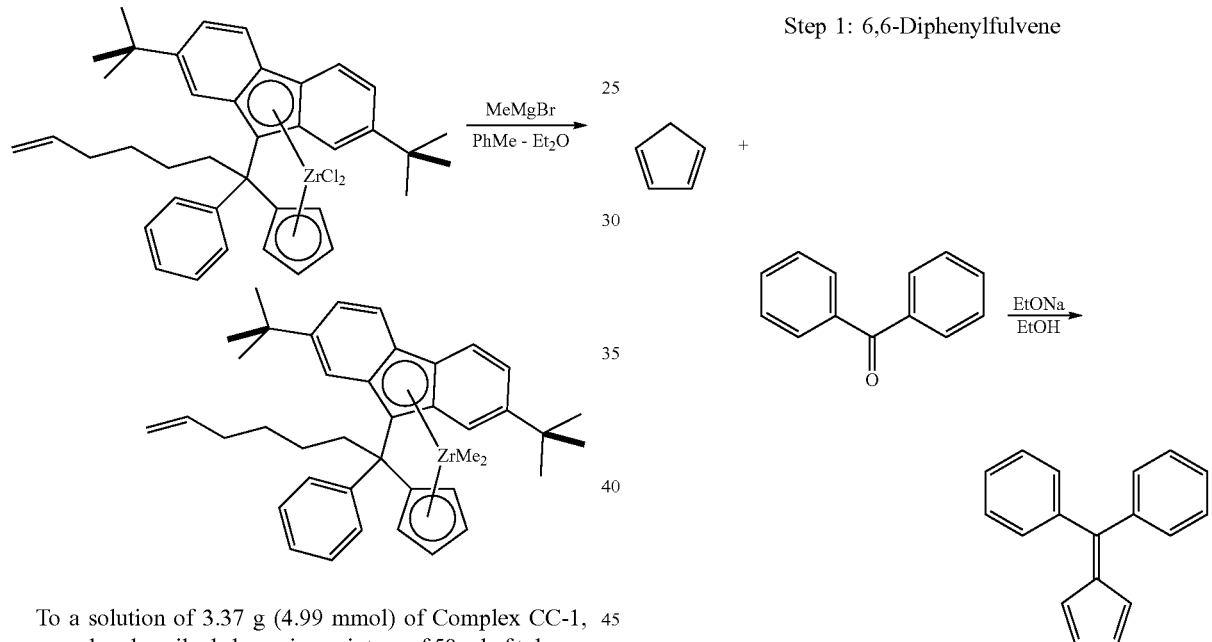

To a solution of 3.37 g (4.99 mmol) of Complex CC-1, prepared as described above, in a mixture of 50 ml of toluene and 25 ml of ether, 7.0 ml (14.77 mmol) of 2.11 M MeMgBr in ether was added. The resulting mixture was refluxed for 30 min and then evaporated to ca. 25 ml. The obtained suspension was heated to 80-90° C. and filtered while hot through glass frit (G3) to remove insoluble magnesium salts. The filter cake was additionally washed with 2×15 ml of toluene. The combined filtrate was evaporated to ca. 10 ml. The obtained solution was heated again to 80-90° C. and filtered while hot through glass frit (G3). The mother liquor was evaporated to dryness, and the residue was dissolved in 12 ml of n-hexane. Yellow powder precipitated from this solution overnight at −40° C. was collected and dried in vacuum. This procedure gave 1.68 g (53.1%) of pure (phenyl)(hex-5-en-1-yl)methylene(cyclopentadienyl)(2,7-di-tert-butylfluoren-9-yl)zirconium dimethyl.

Anal. calc. for C$_{41}$H$_{50}$Zr: C, 77.66; H, 7.95. Found: C, 77.62; H, 8.19.

$^1$H NMR (CDCl$_3$): δ 8.10 (d, J=8.6 Hz, 1H), 8.00 (d, J=8.9 Hz, 1H), 7.79 (dm, J=7.9 Hz, 1H), 7.61-7.54 (m, 2H), 7.52 (dd, J=8.9 Hz, J=1.2 Hz, 1H), 7.50-7.44 (m, 1H), 7.37 (dd, J=8.9 Hz, J=1.6 Hz, 1H), 7.35-7.30 (m, 2H), 6.35-6.29 (m, 1H), 6.22-6.15 (m, 1H), 5.97 (s, 1H), 5.80-5.63 (m, 2H), 5.36-5.30 (m, 1H), 4.92 (dm, J=17.2 Hz, 1H), 4.87 (dm, J=10.0 Hz, 1H), 2.89-2.74 (m, 1H), 2.60-2.45 (m, 1H), 2.11-1.92 (m, 2H), 1.58-1.39 (m, 4H), 1.38 (s, 9H), 0.97 (s, 9H), −1.57 (s, 3H), −1.71 (s, 3H). $^{13}$C{$^1$H} NMR (CDCl$_3$): δ 150.24, 147.86, 144.21, 138.65, 130.62, 128.09, 127.96, 127.22, 126.63, 125.03, 123.57, 123.27, 122.78, 121.01, 120.57, 119.42, 117.91, 117.31, 117.09, 114.42, 113.10, 111.42, 106.37, 102.02, 101.49, 74.70, 53.59, 40.88, 35.35, 34.77, 33.86, 32.24, 31.55, 31.43, 30.80, 29.60, 23.70.

Complex for Comparison (CC-3)

Diphenylmethylene(cyclopentadienyl)(2,7-di-tert-butylfluoren-9-yl)hafnium dimethyl Step 1: 6,6-Diphenylfulvene To a solution of sodium ethoxide, obtained from 3.83 g (166.6 mmol) of sodium metal and 100 ml of dry ethanol, 30.4 g (166.8 mmol) of benzophenone was added. Then, a solution of 19.2 g (273.9 mmol) of cyclopentadiene in 40 ml of dry ethanol was added dropwise over 10 min. The resulting dark-red mixture was stirred for 2 h at room temperature and then 0.5 h at 0° C. The precipitated orange solid was filtered off (G3), washed with 2×40 ml of ethanol, and dried in vacuum to give 33 g of crude product. This solid was recrystallized from 125 ml of hot ethanol. Large red crystals of the title compound precipitated for 2 h at room temperature were collected, washed with 2×40 ml of ethanol and dried in vacuo. This procedure gave 21.3 g (56%) of 6,6-diphenylfulvene.

$^1$H NMR (CDCl$_3$): δ 7.50-7.29 (m, 10H), 6.69-6.59 (m, 2H), 6.39-6.30 (m, 2H). $^{13}$C{$^1$H}NMR (CDCl$_3$): δ 151.95, 143.83, 141.25, 132.29, 132.09, 128.66, 127.68, 124.33.

Step 2: 1,1-Diphenyl-1-cyclopentadienyl-1-(2,7-di-tert-butylfluorenyl)methane

Step 3: Diphenylmethylene(cyclopentadienyl)(2,7-di-tert-butylfluoren-9-yl)hafnium dichloride

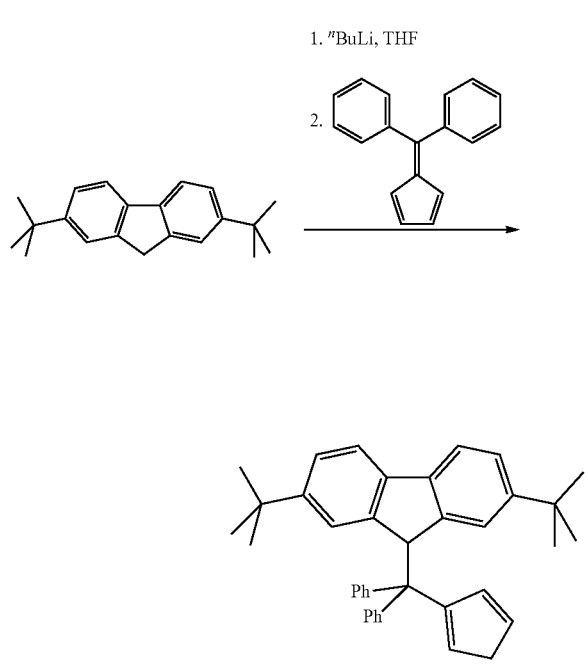

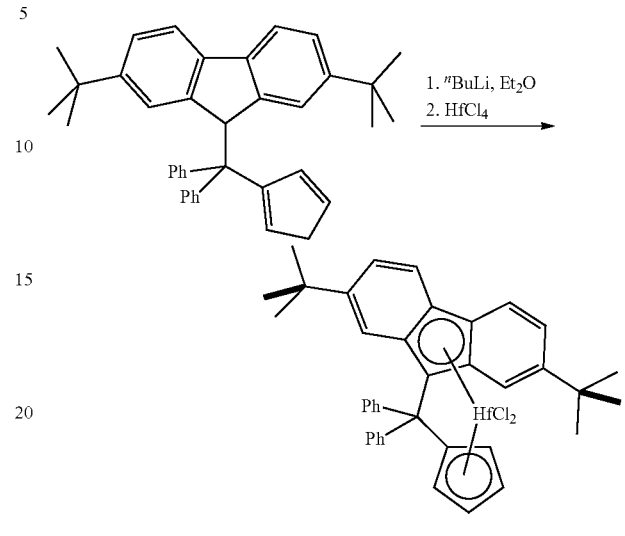

To a solution of 13.92 g (50.0 mmol) of 2,7-di-tert-butylfluorene in 300 ml of THF cooled to −50° C., 20.0 ml (50.0 mmol) of 2.5 M ⁿBuLi in hexanes was added in one portion. This mixture was stirred overnight at room temperature. The resulting orange solution was cooled to −50° C., and 12.1 g (52.54 mmol) of 6,6-diphenylfulvene was added in one portion. After stirring overnight at room temperature the dark-red reaction mixture was cooled in an ice-bath and then quenched using a solution of 4.7 ml of 12 M HCl in 150 ml of water. The resulting orange mixture was extracted with 200 ml of ether. The organic layer was separated, dried over $Na_2SO_4$, and filtered through a pad of silica gel 60 (40-63 μm) which was additionally washed by 2×50 ml of ether. Removal of the solvents under vacuum gave an orange solid, which was triturated with 250 ml of hexane, filtered off (G3), washed with 2×50 ml of hexane and dried in vacuum. This procedure gave 17.68 g of 1,1-diphenyl-1-cyclopentadienyl-1-(2,7-di-tert-butylfluorenyl)methane as a white powder. The combined mother liquor was evaporated to dryness, and the residue was triturated with 50 ml of warm hexane. The formed precipitate was filtered off (G3) and washed with 2×30 ml of hexane. This procedure gave 2.71 g of the target pro-ligand as a slightly yellowish powder. Thus, the total yield of 1,1-diphenyl-1-cyclopentadienyl-1-(2,7-di-tert-butylfluorenyl)methane (as a mixture of double bonds isomers in a ratio ca. 7:1) isolated in this synthesis was 20.39 g (80%).

Anal. calc. for $C_{39}H_{40}$: C, 92.07; H, 7.93. Found: C, 92.20; H, 8.14.

$^1$H NMR (CDCl$_3$): δ 7.74-6.62 (br.m, 16H), 6.62-5.89 (br.m, 3H), 5.48 and 5.44 (2 s, sum 1H), 3.01 and 2.88 (two br.m, sum 2H), 1.17 and 1.13 (2 s, sum 18H). $^{13}$C{$^1$H} NMR (CDCl$_3$): δ 148.37, 144.66, 139.45, 135.55, 129.87, 127.06, 125.95, 124.42, 123.44, 118.01, 59.01, 53.54, 40.70, 34.64, 31.36.

To a solution of 12.72 g (25.0 mmol) of 1,1-diphenyl-1-cyclopentadienyl-1-(2,7-di-tert-butylfluorenyl)methane in 250 ml of ether, cooled to −78° C., 20.0 ml (50.0 mmol) of 2.5 M ⁿBuLi in hexanes was added in one portion. This mixture was stirred overnight at room temperature. The resulting red solution with orange precipitate was cooled to −50° C., and 8.01 g (25.0 mmol) of HfCl$_4$ was added. The formed mixture was stirred for 24 h at room temperature and then evaporated to dryness. The residue was stirred with 200 ml of warm toluene, and the formed suspension was filtered through a glass frit (G4). The filtrate was evaporated to ca. 15 ml, the precipitated orange solid was filtered off (G3), washed with 2×20 ml of a mixture of toluene and hexane (1:1, vol.), and dried in vacuum. This procedure gave 9.52 g (50%) of diphenylmethylene(cyclopentadienyl)(2,7-di-tert-butylfluoren-9-yl)hafnium dichloride.

Anal. calc. for $C_{39}H_{38}Cl_2Hf$: C, 61.95; H, 5.07. Found: C, 62.21; H, 4.90.

$^1$H NMR (CDCl$_3$): δ 8.01 (d, J=8.9 Hz, 2H), 7.96 (br.d, J=8.1 Hz, 2H), 7.88 (br.d, J=8.1 Hz, 2H), 7.57 (dd, J=8.9 Hz, J=1.5 Hz, 2H), 7.44 (td, J=7.6 Hz, J=1.2 Hz, 2H), 7.35 (td, J=7.6 Hz, J=1.2 Hz, 2H), 7.28 (t, J=7.4 Hz, 2H), 6.37 (s, 2H), 6.29 (t, J=2.7 Hz, 2H), 5.64 (t, J=2.7 Hz, 2H), 1.05 (s, 18H). $^{13}$C{$^1$H} NMR (CDCl$_3$): δ 150.30, 144.91, 129.44, 128.99, 128.84, 127.09, 126.56, 124.30, 123.87, 120.37, 119.39, 119.19, 117.35, 112.96, 100.24, 77.97, 57.98, 34.96, 30.58.

Step 4: Diphenylmethylene(cyclopentadienyl)(2,7-di-tert-butylfluoren-9-yl)hafnium dimethyl

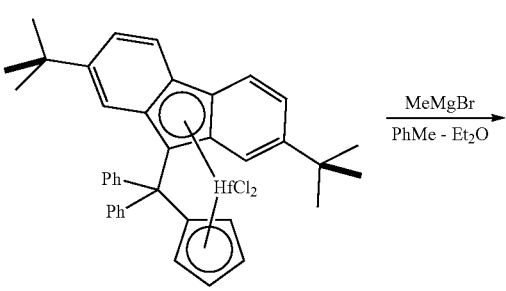

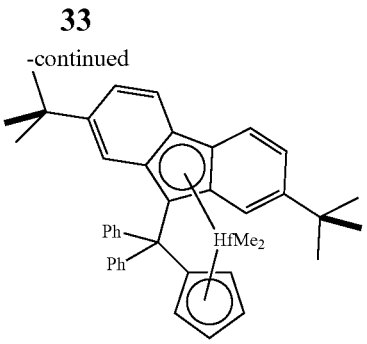

To a solution of 3.78 g (5.0 mmol) of diphenylmethylene(cyclopentadienyl)(2,7-di-tert-butylfluoren-9-yl)hafnium dichloride in a mixture of 50 ml of toluene and 50 ml of ether, 7.0 ml (14.77 mmol) of 2.11 M MeMgBr in ether was added. The resulting mixture was refluxed for 30 min and then evaporated to ca. 25 ml. The obtained mixture was heated to 80-90° C. and filtered while hot through glass frit (G4) to remove insoluble magnesium salts. The filter cake was additionally washed with 5×20 ml of warm hexane. The combined filtrate was evaporated to ca. 5 ml, and then 20 ml of hexane was added to the residue. Yellow powder precipitated from this solution was collected and dried in vacuum. This procedure gave 3.14 g (88%) of pure diphenylmethylene(cyclopentadienyl)(2,7-di-tert-butylfluoren-9-yl)hafnium dimethyl.

Anal. calc. for $C_{41}H_{44}Hf$: C, 68.85; H, 6.20. Found: C, 69.10; H, 6.37.

$^1$H NMR (CDCl$_3$): δ 8.07 (d, J=8.9 Hz, 2H), 7.95 (br.d, J=7.9 Hz, 2H), 7.85 (br.d, J=7.9 Hz, 2H), 7.44 (dd, J=8.9 Hz, J=1.5 Hz, 2H), 7.37 (td, J=7.6 Hz, J=1.2 Hz, 2H), 7.28 (td, J=7.6 Hz, J=1.2 Hz, 2H), 7.24-7.17 (m, 2H), 6.26 (s, 2H), 6.20 (t, J=2.7 Hz, 2H), 5.45 (t, J=2.7 Hz, 2H), 1.03 (s, 18H), −1.90 (s, 6H). $^{13}$C{H} NMR (CDCl$_3$): δ 148.46, 145.75, 129.69, 128.63, 128.46, 126.73, 126.54, 123.29, 122.62, 120.97, 118.79, 116.09, 111.68, 107.76, 101.56, 76.47, 57.91, 37.61, 34.88, 30.84.

Complex for Comparison (CC-4)

(1-hexyl)(phenyl)methylene(cyclopentadienyl)(2,7-di-tert-butylfluoren-9-yl)hafnium dimethyl Step 1: 6-Phenyl-6-hexylfulvene

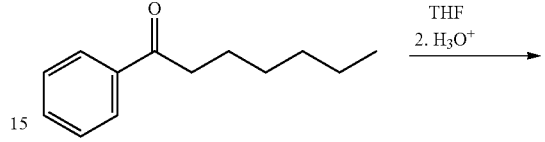

To a solution of 23.8 g (125.1 mmol) of 1-phenylheptan-1-one in 50 ml of THF cooled in an ice-bath a solution of 25.4 g (150 mmol, 1.2 equiv.) of cyclopentadienylmagnesium bromide in 150 ml of THF was added dropwise. The resulting mixture was refluxed for 3 h, then stirred overnight at room temperature, finally, cooled in an ice-bath and then quenched with 10% HCl to pH-5-6. This mixture was extracted with 3×150 ml of hexane, the combined organic extract was dried over Na$_2$SO$_4$ and then evaporated to dryness to give a dark-red oil. The product was isolated by flash-chromatography on silica gel 60 (40-63 μm; eluent: hexane-ethyl acetate=100:1, vol.). This procedure gave 14.25 g (48%) of 6-phenyl-6-hexylfulvene as a reddish oil.

Anal. calc. for $C_{18}H_{22}$: C, 90.70; H, 9.30. Found: C, 90.87; H, 9.27.

$^1$H NMR (CDCl$_3$): δ 7.37-7.30 (m, 5H), 6.63 (ddd, J=5.3 Hz, J=2.0 Hz, J=1.5 Hz, 1H), 6.55 (ddd, J=5.3 Hz, J=2.0 Hz, J=1.5 Hz, 1H), 6.46 (ddd, J=5.3 Hz, J=2.0 Hz, J=1.5 Hz, 1H), 6.10 (ddd, J=5.3 Hz, J=2.0 Hz, J=1.5 Hz, 1H), 2.90 (t, J=7.6 Hz, 2H), 1.47-1.36 (m, 2H), 1.34-1.15 (m, 6H), 0.83 (t, J=6.9 Hz, 3H). $^{13}$C{$^1$H} NMR (CDCl$_3$): δ 154.81, 143.31, 140.87, 131.71, 131.32, 129.42, 127.97, 127.73, 123.86, 120.90, 36.25, 31.51, 29.54, 29.13, 22.46, 13.97.

Step 2: (1-Hexyl)(phenyl)methylene(cyclopentadienyl)(2,7-di-tert-butylfluoren-9-yl)hafnium dichloride 1. $^n$BuLi, THF

2.

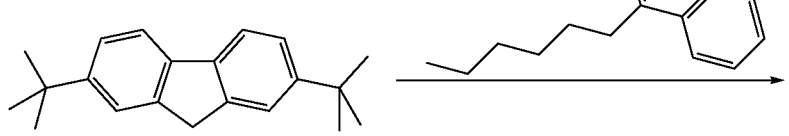

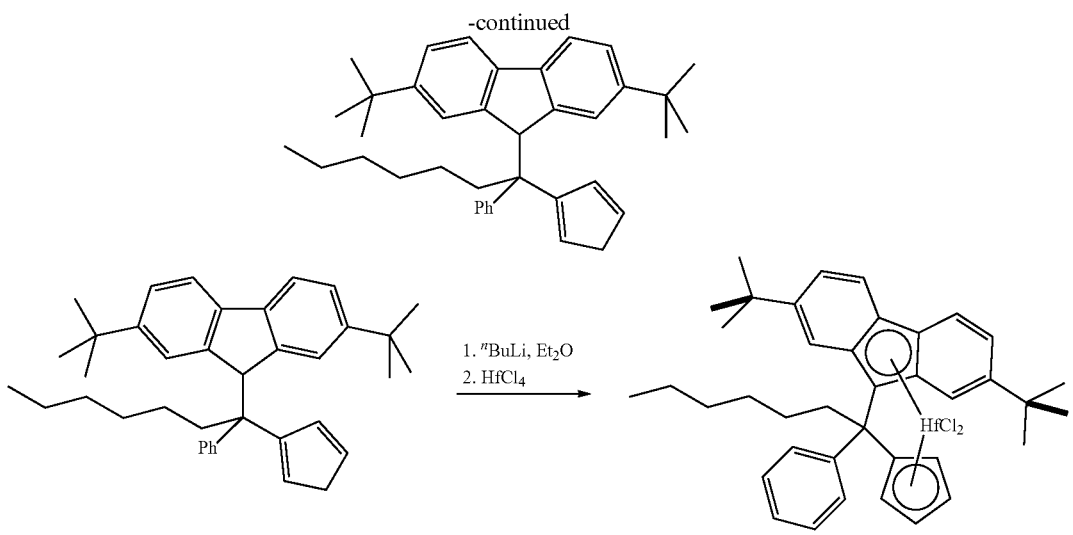

To a solution of 14.88 g (53.44 mmol) of 2,7-di-tert-butylfluorene in 200 ml of THF, cooled to −50° C., 21.4 ml (53.5 mmol) of 2.5 M ″BuLi in hexanes was added in one portion. This mixture was stirred overnight at room temperature. The resulting reddish solution was cooled to −50° C., and a solution of 14.25 g (59.78 mmol) of 6-phenyl-6-hexylfulvene in 200 ml of THF was added in one portion. After stirring overnight at room temperature the dark-red reaction mixture was cooled in an ice-bath and then quenched with a solution of 5 ml of 12 M HCl in 200 ml of water. The resulting yellow mixture was extracted with 400 ml of dichloromethane. The organic layer was separated, and the aqueous one was extracted with 150 ml of dichloromethane. The combined organic extract was dried over $Na_2SO_4$ and filtered through a pad of silica gel 60 (40-63 μm) which was additionally washed by 2×50 ml of dichloromethane. The combined filtrate was evaporated to dryness to give 29.1 g of 1-phenyl-1-hexyl-1-cyclopentadienyl-1-(2,7-di-tert-butylfluorenyl)methane which was further used without an additional purification. To a cooled to −78° C. solution of 16.2 g (31.35 mmol) of 1-phenyl-1-hexyl-1-cyclopentadienyl-1-(2,7-di-tert-butylfluorenyl)methane (as prepared above) in 250 ml of ether 25.0 ml (62.5 mmol) of 2.5 M ″BuLi in hexanes was added in one portion. The formed mixture was stirred overnight at room temperature, then cooled to −50° C., and 10.04 g (31.35 mmol) of $HfCl_4$ was added. The obtained mixture was stirred for 24 h at room temperature and then evaporated to dryness. The residue was stirred with 200 ml of warm toluene, and the formed suspension was filtered through a glass frit (G4). The filtrate was evaporated to ca. 40 ml. Yellow crystalline material precipitated from this mixture over a week at −30° C. was separated, washed with 3×15 ml of a mixture of toluene and hexane (1:3, vol.) and dried in vacuum. This procedure gave 14.2 g (59%) of (1-hexyl)(phenyl)methylene(cyclopentadienyl)(2,7-di-tert-butylfluoren-9-yl)hafnium dichloride.

Anal. calc. for $C_{39}H_{46}Cl_2Hf$: C, 61.30; H, 6.07. Found: C, 61.53; H, 6.26.

$^1H$ NMR ($CDCl_3$): δ 8.01 (d, J=8.9 Hz, 1H), 7.95 (d, J=8.9 Hz, 1H), 7.82 (dm, J=7.9 Hz, 1H), 7.70 (s, 1H), 7.66-7.58 (m, 2H), 7.58-7.52 (m, 1H), 7.52-7.46 (m, 1H), 7.44-7.36 (m, 2H), 6.36-6.30 (m, 1H), 6.23-6.17 (m, 1H), 6.13 (s, 1H), 5.80-5.74 (m, 1H), 5.55-5.49 (m, 1H), 3.13-2.97 (m, 1H), 2.80-2.65 (m, 1H), 1.64-1.44 (m, 3H), 1.40 (s, 9H), 1.36-1.18 (m, 5H), 0.99 (s, 9H), 0.85 (t, J=7.9 Hz, 3H). $^{13}C\{^1H\}$ NMR ($CDCl_3$): δ 152.11, 149.53, 143.32, 130.53, 128.46, 128.26, 127.17, 127.05, 124.17, 124.14, 123.97, 123.49, 122.63, 120.25, 119.84, 119.65, 118.84, 118.79, 117.87, 116.58, 114.58, 99.64 (two resonances), 77.83, 53.68, 41.28, 35.42, 34.84, 31.88, 31.11, 30.51, 29.75, 24.03, 22.63, 14.05.

Step 3: (1-Hexyl)(phenyl)methylene(cyclopentadienyl)(2,7-di-tert-butylfluoren-9-yl)hafnium dimethyl

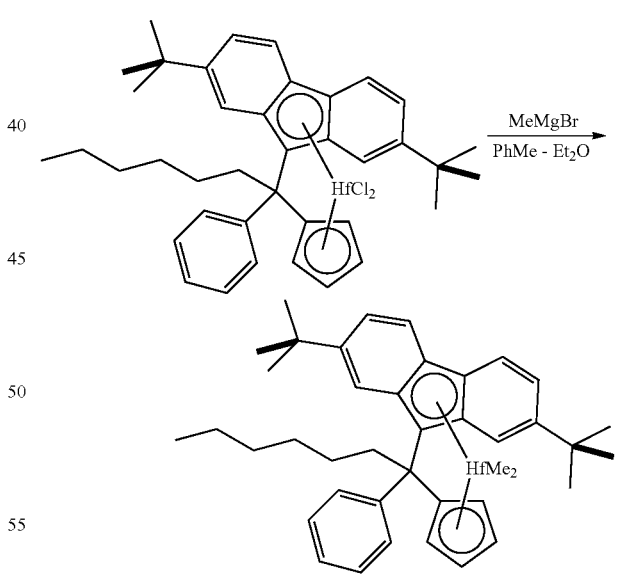

To a solution of 3.82 g (5.0 mmol) of (1-hexyl)(phenyl)methylene(cyclopentadienyl)(2,7-di-tert-butylfluoren-9-yl)hafnium dichloride in a mixture of 50 ml of toluene and 50 ml of ether, 7.0 ml (14.77 mmol) of 2.11 M MeMgBr in ether was added. The resulting mixture was refluxed for 30 min and then evaporated to ca. 25 ml. The obtained solution was heated to 80-90° C. and filtered while hot through glass frit (G3) to remove insoluble magnesium salts. The filter cake was additionally washed with 2×20 ml of toluene. The combined filtrate was evaporated to dryness, and 20 ml of hexane was added to the residue. The resulting suspension was filtered once again through a glass frit (G4). The filtrate was evaporated to dryness, and the residue was dissolved in 7 ml of hexane. Yellow powder precipitated from this solution overnight at −40° C. was collected and dried in vacuum. This procedure gave 2.55 g (71%) of pure (1-hexyl)(phenyl)methylene(cyclopentadienyl)(2,7-di-tert-butylfluoren-9-yl)hafnium dimethyl.

Anal. calc. for $C_{41}H_{52}Hf$: C, 68.08; H, 7.25. Found: C, 68.11; H, 7.46.

$^1H$ NMR (CDCl$_3$): δ 8.07 (d, J=8.9 Hz, 1H), 7.98 (d, J=8.9 Hz, 1H), 7.81 (dm, J=7.9 Hz, 1H), 7.63-7.56 (m, 2H), 7.53-7.43 (m, 2H), 7.38-7.30 (m, 3H), 6.28-6.21 (m, 1H), 6.14-6.08 (m, 1H), 6.03 (s, 1H), 5.65-5.59 (m, 1H), 5.34-5.28 (m, 1H), 2.92-2.81 (m, 1H), 2.59-2.48 (m, 1H), 1.52-1.40 (m, 3H), 1.38 (s, 9H), 1.34-1.17 (m, 5H), 0.97 (s, 9H), 0.84 (t, J=7.0 Hz, 3H), −1.76 (s, 3H), −1.90 (s, 3H). $^{13}C\{^1H\}$ NMR (CDCl$_3$): δ 150.18, 147.73, 144.31, 130.72, 128.04, 127.90, 127.20, 126.59, 124.49, 123.74, 122.90, 122.73, 121.01, 120.61, 119.11, 117.56, 116.32, 115.83, 112.85, 111.08, 109.58, 100.94, 100.57, 76.51, 53.50, 41.19, 38.16, 37.39, 35.32, 34.75, 31.93, 31.35, 30.75, 29.86, 24.12, 22.68, 14.08.

Complex Elemental Analysis (ICP Method):

| Complex | Hf (%) purity | Zr (%) impurity |
|---|---|---|
| C2 | 99.62 | 0.38 |
| C3 | 99.68 | 0.32 |
| CC-3 | 99.56 | 0.44 |
| CC-4 | 99.61 | 0.39 | b) Polymerization Procedure

Polymerization tests have been performed in 125 mL reactors equipped with a bottom valve, at 180° C. or 160° C. and different C8/C2 weight ratios in the liquid phase. Different catalyst loadings have been tested to find the optimal amount to guarantee almost constant temperature and pressure during the 10 minutes of polymerization. Methylaluminoxan/tri-isobutylaluminium (MAO/TIBA) has been used as the cocatalyst for all the experiments Activation Procedure a. MAO/TIBA Preparation:

MAO/TIBA [(CH$_3$)$_{0.33}$($^iC_4H_8$)$_{0.64}$AlO]$_n$ has been prepared with Chemtura MAO 30% wt in toluene and neat TIBA to yield a 2/1 molar mixture (MAO$^C$/TIBA).

TIBA (4.30 g, 2.17×10−2 mol) was added to a solution of Chemtura MAO 30% wt in toluene (8.39 g, 4.34×10−2 mol) in a Schott glass bottle placed in a glove box and dried several days at 160° C. prior to use. The mixture was then stirred at room temperature for one hour. The resulting clear colourless solution was stored in a glove box and further used as such (concentration: 2.75×10−3 mol Al/g).

b. Catalyst Activation:

The catalyst solution was prepared by dissolving the desired amount of complex into the MAO/TIBA solution to reach an Al/Hf or Al/Zr molar ratio of 200.

For all experiments except those reported in table 3, the solution is aged overnight (~12 hours) prior to injection into the reactor.

Polymerization Procedure

The 125 mL reactor was filled with the desired amount (see Table 1) of solvent (isopar E), the scavenger (0.5 mmol of MAO/TiBA) and 1-octene. Solvent and monomers amounts were chosen to have an initial liquid volume of 80 mL at the polymerization conditions.

The reactor was then heated up and carefully pressurised with ethylene (25-28 bar-g). When conditions were stable the ethylene pressure was adjusted to 30 bar-g and the mixture was allowed to stir at 750 rpm during 10 minutes in order to determine the residual ethylene uptake. After this time the catalytic solution (diluted with 4 mL of toluene) was injected and the pressure was kept constant by feeding ethylene. After 10 minutes of polymerization an overpressure of CO2 has been used as killing agent. Then the reactor was vented, the temperature decreased and then the vessel was opened and the solution discharged in an aluminium pan containing few milligrams (~500 ppm related to the copolymer produced) of Irganox 1076. The pan was then placed under a well-ventilated fume hood until the volatiles are evaporated. The collected residual material is analysed by HT-SEC and DSC.

TABLE 1

C2/C8 copolymerization results at 180° C., 30 bar-g, activator MAO/TiBA 2/1 molar, Al/Hf 200 molar, scavenger MAO/TiBA 0.5 mmol
Inventive Examples IE1-IE7 and Comparative Examples CE1 to CE4

| Ex unit | Complex | Isopar E ml | C8 feed ml | Productivity kg PE/g$_{cat}$ in 10 min | Average. C8/C2 ratio in solution wt/wt | C8 in polymer (NMR) % wt | Reactivity ratio C8/C2 | HT-SEC Mw kDa | PDI |
|---|---|---|---|---|---|---|---|---|---|
| IE1 | C1 | 67 | 8 | 8.4 | 2.2 | 21.7 | 0.13 | 80 | 3.1 |
| IE2 | C2 | 75 | 5 | 8.2 | 1.4 | 14.7 | 0.12 | 88 | 3.0 |
| IE3 | C2 | 73 | 7 | 10.8 | 2.1 | 20.1 | 0.12 | 78 | 3.0 |
| IE4 | C2 | 70 | 10 | 9.4 | 2.9 | 25.2 | 0.12 | 75 | 3.2 |
| IE5 | C3 | 75 | 5 | 10.1 | 1.4 | 14.8 | 0.12 | 90 | 2.7 |
| IE6 | C3 | 73 | 7 | 13.5 | 2.0 | 20.0 | 0.13 | 78 | 3.2 |
| IE7 | C3 | 70 | 10 | 11.2 | 2.8 | 26.0 | 0.12 | 75 | 3.2 |
| CE1 | CC1 | 67 | 8 | 104.1 | 2.2 | 12.2 | 0.06 | 44 | 3.0 |
| CE2 | CC2 | 67 | 8 | 40.9 | 2.3 | 11.1 | 0.05 | 46 | 2.4 |
| CE3 | CC3 | 67 | 8 | 2.0 | 2.4 | 12.9 | 0.06 | 73 | 3.4 |
| CE4 | CC4 | 67 | 8 | 6.2 | 2.3 | 13.3 | 0.07 | 62 | 2.8 |

Table 1 shows that, despite the higher activity of the zirconium complex:

a) The hafnium complexes according to the invention have much higher comonomer reactivity compared to zirconium analogues
b) The hafnium complexes have much higher molecular weight capability compared to zirconium analogues, even for copolymers with higher octene content (lower density) That is, the hafnium complexes have overall a better performance than their zirconium analogues for the production of low density, high molecular weight $C_2$/alpha-olefin (preferably octene) copolymers.

TABLE 2

C2/C8 copolymerization results at 160° C., 30 bar-g, activator MAO/TiBA 2/1 molar, Al/Hf 200 molar, scavenger MAO/TIBA 0.5 mmol
Inventive Examples IE8-IE10

| Ex unit | Complex | Isopar E ml | C8 feed ml | Productivity kg PE/$g_{cat}$ in 10 min | Average. C8/C2 ratio in solution wt/wt | C8 in polymer (Tg) % wt | Reactivity ratio C8/C2 | HT-SEC Mw kDa | PDI |
|---|---|---|---|---|---|---|---|---|---|
| IE8 | C2 | 70 | 6 | 54.5 | 1.3 | 14.7 | 0.14 | 132 | 3.4 |
| IE9 | C3 | 70 | 6 | 36.7 | 1.2 | 17.6 | 0.18 | 160 | 4.3 |
| IE10 | C4 | 70 | 6 | 43.4 | 1.2 | 15.6 | 0.15 | 131 | 3.6 |

From Table 2 compared to Table 1 it can be seen that the activity at 160° C. is much higher than at 180° C.

To test the activating capability for the present Hafnium complexes as a function of time, the catalyst performance as a function of MAO/TIBA/complex pre-contact time (aging time) was compared. (IE11 to IE15)

TABLE 3

C2/C8 copolymerization results for C3 at 160° C., 30 bar-g, activator MAO/TiBA 2/1 molar, Al/Mt 200 molar, scavenger MAO/TIBA 0.5 mmol, with different precontacting times

| Ex unit | Complex | Aging time hours | Productivity kg PE/$g_{cat}$ in 10 min | Average. C8/C2 ratio in solution wt/wt | C8 in polymer (Tg) % wt | Reactivity ratio C8/C2 | GPC Mw kDa | PDI |
|---|---|---|---|---|---|---|---|---|
| IE11 | C3 | 0 | 3.1 | 1.3 | 16.5 | 0.16 | 115 | 6.2 |
| IE12 | C3 | 6 | 36.7 | 1.2 | 17.6 | 0.18 | 160 | 4.3 |
| IE13 | C3 | 14 | 39.5 | 1.3 | 17.0 | 0.20 | 142 | 4 |
| IE14 | C3 | 24 | 47.3 | 1.3 | 16.3 | 0.15 | 146 | 4.1 |
| IE15 | C3 | 48 | 44.2 | 1.3 | 17.7 | 0.17 | 142 | 4.3 |

Example IE11 has activation in reactor, which means no precontacting time between complex and MAO/TiBA.

The invention claimed is:

1. A catalyst system wherein the catalyst system consists of:
   (i) one metallocene complex, wherein the one metallocene complex is of formula (I):

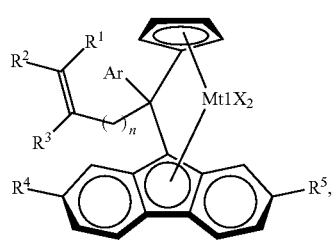

(I)

wherein
Mt1 is Hf,
X is a sigma-donor ligand,
$R^1$, $R^2$, $R^3$ are the same or different from each other and are hydrogen or a saturated linear or branched $C_1$-$C_{10}$ alkyl group, wherein the alkyl group optionally comprises up to 2 heteroatoms belonging to groups 14-16 of the periodic table, or wherein $R^1$ and $R^2$ or $R^2$ and $R^3$ form a ring having 4 to 6 C-atoms and 1 to 3 double bonds,
$R^4$ and $R^5$ are the same or different from each other and are saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which optionally comprise up to 2 heteroatoms belonging to groups 14-16 of the periodic table,
n is 1 to 5,
Ar is a $C_6$-$C_{20}$-aryl or -heteroaryl group, which is unsubstituted or substituted by 1 to 5 linear or branched $C_1$-$C_{10}$ alkyl group(s), and
(ii) an aluminoxane cocatalyst, and
(iii) optionally an aluminium alkyl compound $Al(R^7)_3$, with $R^7$ being a linear or branched C2-C8-alkyl group;
or
wherein the catalyst system consists of
(i) two metallocene complexes, present as a mixture of the metallocene complex of formula (I) with a metallocene complex of formula (I'):

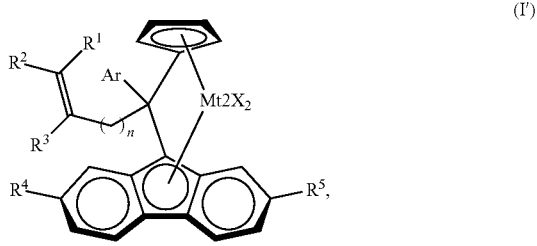

wherein Mt2 is Zr, $R^1$ to $R^5$ and Ar are defined as for the complex of formula (I), provided that the mixture comprises more than 50% by moles of the complex of formula (I) with Mt1 being Hf; and
(ii) an aluminoxane cocatalyst, and
(iii) optionally an aluminium alkyl compound $Al(R^7)_3$, with $R^7$ being a linear or branched C2-C8-alkyl group;
wherein the catalyst system shows a reactivity ratio $C_{AO}/C_2$ of at least 0.1, wherein AO is C4-10 alpha-olefin comonomer, in a high temperature solution process.

2. The catalyst system of claim 1, wherein in the formula (I):
Mt1 is Hf,
X is independently a hydrogen atom, a halogen atom, a $R^6$, $OR^6$, $OSO_2CF_3$, $OCOR^6$, $SR^6$, $NR^6_2$ or $PR^6_2$ group, wherein $R^6$ is a linear or branched, cyclic or acyclic, $C_1$-$C_{20}$-alkyl, $C_2$-$C_{20}$-alkenyl, $C_2$-$C_{20}$-alkynyl, $C_6$-$C_{20}$-aryl, $C_7$-$C_{20}$-alkylaryl or $C_7$-$C_{20}$-arylalkyl radical, optionally comprising up to 2 heteroatoms belonging to groups 14-16 of the periodic table, or is $SiR^6_3$, $SiHR^6_2$ or $SiH_2R^6$,
$R^1$, $R^2$, $R^3$ are the same or different from each other and are hydrogen or a saturated linear or branched $C_1$-$C_6$ alkyl group, wherein the alkyl group does not comprise any heteroatom belonging to groups 14-16 of the periodic table, or $R^1$ is hydrogen and $R^2$ and $R^3$ form a ring having 5 to 6 C-atoms and 1 to 3 double bonds,
$R^4$ and $R^5$ are the same or different from each other and are a saturated linear or branched $C_1$-$C_{10}$ alkyl or $C_6$-$C_{10}$ aryl group, wherein the groups do not comprise any heteroatom belonging to groups 14-16,
Ar is a $C_6$-$C_{10}$-aryl or -heteroaryl group, which is unsubstituted or substituted by one linear or branched $C_1$-$C_6$ alkyl group, and wherein
n is 2 to 4.

3. The catalyst system of claim 2, wherein in the formula (I):
Mt1 is Hf,
X is independently a halogen atom or a $R^6$ or $OR^6$ group, wherein $R^6$ is a $C_{1-6}$-alkyl, phenyl or benzyl group,
$R^1$, $R^2$, $R^3$ are the same or different from each other and are hydrogen, a saturated linear or branched $C_1$-$C_4$ alkyl group, wherein the alkyl group does not comprise any heteroatom belonging to groups 14-16 of the periodic table, or $R^1$ is hydrogen and $R^2$ and $R^3$ form a ring having 6 C-atoms and 3 double bonds,
$R^4$ and $R^5$ are the same or different from each other and are a saturated linear or branched $C_1$-$C_6$ alkyl or phenyl group, wherein the groups do not comprise any heteroatoms belonging to groups 14-16 of the periodic table,
Ar is an unsubstituted $C_6$-$C_{10}$-aryl group, and n is 2 to 4.

4. The catalyst system of claim 3, wherein in the formula (I):
Mt1 is Hf,
X is independently a methyl, chloro or benzyl group,
$R^1$, $R^2$, $R^3$ are the same and are all hydrogen or $R^1$ is hydrogen and $R^2$ and $R^3$ form a ring having 6 C-atoms and 3 double bonds,
$R^4$ and $R^5$ are the same and are a saturated linear or branched $C_2$-$C_6$ alkyl group,
n is 2 to 4, and Ar is phenyl.

5. The catalyst system of claim 1, wherein the metallocene complex of formula (I) is selected from:
(phenyl)(but-3-en-1-yl)methylene(cyclopentadienyl)(2,7-di-tert-butylfluoren-9-yl)hafnium dimethyl,
(phenyl)(but-3-en-1-yl)methylene(cyclopentadienyl)(2,7-di-tert-butylfluoren-9-yl)hafnium dibenzyl,
(phenyl)(but-3-en-1-yl)methylene(cyclopentadienyl)(2,7-di-tert-butylfluoren-9-yl)hafnium dichloride,
(phenyl)(4-penten-1-yl)methylene(cyclopentadienyl)(2,7-di-tert-butylfluorenyl)hafnium dimethyl,
(phenyl)(4-penten-1-yl)methylene(cyclopentadienyl)(2,7-di-tert-butylfluorenyl)hafnium dibenzyl,
(phenyl)(4-penten-1-yl)methylene(cyclopentadienyl)(2,7-di-tert-butylfluorenyl)hafnium dichloride,
(phenyl)(5-hexen-1-yl)methylene(cyclopentadienyl)(2,7-di-tert-butylfluoren-9-yl)hafnium dimethyl,
(phenyl)(5-hexen-1-yl)methylene(cyclopentadienyl)(2,7-di-tert-butylfluoren-9-yl)hafnium dibenzyl, or
(phenyl)(5-hexen-1-yl)methylene(cyclopentadienyl)(2,7-di-tert-butylfluoren-9-yl)hafnium dichloride,
and which is optionally mixed with a corresponding metallocene complex of formula (I'):

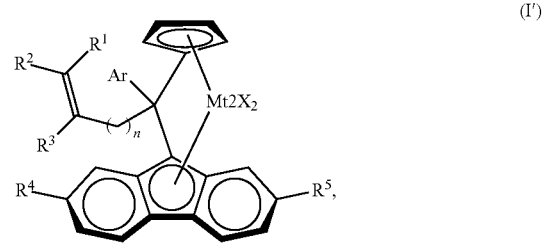

wherein Mt2 is Zr, $R^1$ to $R^5$ and Ar are defined as for the complex of formula (I), provided that the mixture comprises more than 50% by moles of the complex of formula (I) with Mt1 being Hf.

6. The catalyst system of claim 1, wherein the catalyst system is homogeneous or non-supported catalyst systems, wherein the catalyst system is prepared in a solution, by contacting the metallocene complex of formula (I) or a mixture of the metallocene complex of formula (I) with a metallocene complex of formula (I'):

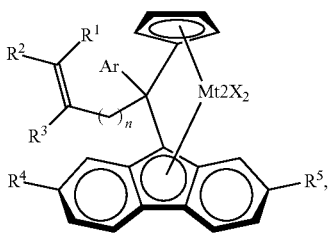

(I')

wherein Mt2 is Zr, $R^1$ to $R^5$ and Ar are defined as for the complex of formula (I), provided that the mixture comprises more than 50% by moles of the complex of formula (I) with Mt1 being Hf, as a solid or as a solution, with the cocatalyst in a hydrocarbon diluent or previously dissolved in an aromatic solvent, or which is formed by sequentially adding the catalyst system components directly into a polymerization reactor.

7. The catalyst system of claim 1, wherein the aluminoxane cocatalyst is methylaluminoxane.

8. The catalyst system of claim 1, wherein the aluminium alkyl compound of the formula $Al(R^7)_3$ with $R^7$ being a linear or branched $C_2$-$C_8$-alkyl group is present, and wherein the aluminium alkyl compound of the formula $Al(R^7)_3$ together with the aluminoxane are used as cocatalyst.

9. The catalyst system of claim 8, wherein the cocatalyst is a reaction product of the aluminoxane with the aluminium alkyl compound $Al(R^7)_3$.

10. A process for preparing a catalyst system of claim 1, comprising an activation method comprising contacting at least one metallocene complex of formula (I):

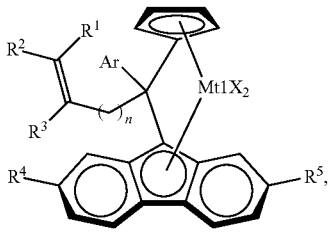

(I)

wherein

Mt1 is Hf,

X is a sigma-donor ligand, $R^1$, $R^2$, $R^3$ are the same or different from each other and are hydrogen or a saturated linear or branched $C_1$-$C_{10}$ alkyl group, wherein the alkyl group optionally comprises up to 2 heteroatoms belonging to groups 14-16 of the periodic table, or wherein $R^1$ and $R^2$ or $R^2$ and $R^3$ form a ring having 4 to 6 C-atoms and 1 to 3 double bonds, $R^4$ and $R^5$ are the same or different from each other and are saturated linear or branched $C_1$-$C_{10}$ alkyl, $C_5$-$C_{10}$ aryl, $C_6$-$C_{20}$ alkylaryl or $C_6$-$C_{20}$ arylalkyl groups, which optionally comprise up to 2 heteroatoms belonging to groups 14-16 of the periodic table, n is 1 to 5, Ar is a $C_6$-$C_{20}$-aryl or -heteroaryl group, which is unsubstituted or substituted by 1 to 5 linear or branched $C_1$-$C_{10}$ alkyl group(s), optionally mixed with a metallocene complex of formula (I'):

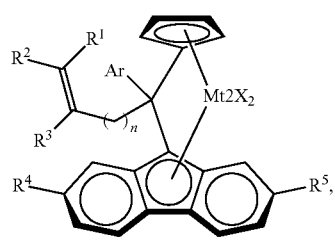

(I')

wherein Mt2 is Zr, $R^1$ to $R^5$ and Ar are defined as for the complex of formula (I), provided that the mixture comprises more than 50% by moles of the complex of formula (I) with Mt1 being Hf, with a reaction product of an aluminoxane cocatalyst with an aluminium alkyl compound $Al(R^7)_3$, with $R^7$ being a linear or branched $C_2$-$C_8$-alkyl group, before being introduced into a polymerization reactor.

* * * * *